US011634048B2

(12) United States Patent
Tanaka et al.

(10) Patent No.: US 11,634,048 B2
(45) Date of Patent: Apr. 25, 2023

(54) VEHICLE SEAT

(71) Applicant: NHK Spring Co., Ltd., Kanagawa (JP)

(72) Inventors: Daisuke Tanaka, Kanagawa (JP);
Kenichi Katsube, Kanagawa (JP);
Donghyoun Kim, Kanagawa (JP);
Takuma Oki, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 16/737,953

(22) Filed: Jan. 9, 2020

(65) Prior Publication Data
US 2020/0223326 A1 Jul. 16, 2020

(30) Foreign Application Priority Data
Jan. 15, 2019 (JP) .............................. JP2019-004684

(51) Int. Cl.
B60N 2/20 (2006.01)
B60N 2/34 (2006.01)
B60N 2/80 (2018.01)
B60N 2/90 (2018.01)
B64D 11/06 (2006.01)
B60N 2/02 (2006.01)
(Continued)

(52) U.S. Cl.
CPC ........... B60N 2/0232 (2013.01); B60N 2/005 (2013.01); B60N 2/0248 (2013.01); B60N 2/2222 (2013.01); B60N 2/853 (2018.02); B60N 2/995 (2018.02)

(58) Field of Classification Search
CPC ...... B60N 2/0232; B60N 2/853; B60N 2/995; B60N 2/005; B60N 2/0248; B60N 2/2222

USPC ............... 297/94, 118, 233, 245, 284.3, 331, 297/354.11, 330, 423.26, 423.3
See application file for complete search history.

(56) References Cited

U.S. PATENT DOCUMENTS 4,641,884 A * 2/1987 Miyashita ............ B60N 2/2252
297/284.3 X
5,058,953 A * 10/1991 Takagi ................. B60N 2/2222
297/284.4
(Continued)

FOREIGN PATENT DOCUMENTS

CA 2852450 A1 * 1/2015 ......... B64D 11/0643
JP H07040256 7/1995
(Continued)

OTHER PUBLICATIONS

Japanese Office Action (with English translation) for corresponding Japanese Application No. 2019-004684, dated Mar. 31, 2022, 5 pages.

Primary Examiner — Rodney B White
(74) Attorney, Agent, or Firm — Dority & Manning, P.A.

(57) ABSTRACT

A vehicle seat is provided including a base section fixed to a floor of a vehicle, a pair of seat sections that are disposed opposing each other as viewed along a seat width direction, that are each supported by the base section so as to be capable of tilting between a horizontal position and an upright position, and that each include plural cushion sections disposed in series and configured to support the body of an occupant, and a hinge mechanism that attaches the pair of seat sections to the base section such that the seat sections are capable of tilting, and that couples the plural cushion sections together such that the cushion sections are capable of swinging about an axis running along the seat width direction.

5 Claims, 14 Drawing Sheets

(51) Int. Cl.
  *B60N 2/853* (2018.01)
  *B60N 2/22* (2006.01)
  *B60N 2/005* (2006.01)

(56) References Cited

U.S. PATENT DOCUMENTS

| | | | | |
|---|---|---|---|---|
| 5,120,109 | A * | 6/1992 | Rangoni | B60N 2/1803 297/284.3 |
| 5,447,356 | A * | 9/1995 | Snijders | A47C 7/405 297/284.3 |
| 5,628,547 | A * | 5/1997 | Matsumiya | B60N 2/242 297/354.11 |
| 5,765,910 | A * | 6/1998 | Larkin | A47B 83/001 297/362.12 X |
| 7,281,760 | B2 * | 10/2007 | Braitmaier | B60N 2/0252 297/233 X |
| 7,374,242 | B2 * | 5/2008 | Champ | B60N 2/3031 297/331 X |
| 7,404,603 | B2 * | 7/2008 | Dewert | A47C 7/00 297/331 X |
| 7,419,214 | B2 * | 9/2008 | Plant | B64D 11/0606 297/245 |
| 7,547,068 | B2 * | 6/2009 | Davis | B60N 2/2222 297/284.3 X |
| 7,686,394 | B2 * | 3/2010 | Nishikawa | B60N 2/2222 297/284.3 |
| 7,802,846 | B2 * | 9/2010 | Bellefleur | A47C 1/0244 297/284.3 |
| 7,845,729 | B2 * | 12/2010 | Yamada | B60N 2/0232 297/354.11 X |
| 8,348,339 | B2 * | 1/2013 | Onuma | B60N 2/0232 297/284.3 |
| 8,708,417 | B2 * | 4/2014 | Mejuhas | B60N 2/62 297/423.26 |
| 8,899,683 | B2 * | 12/2014 | Ito | B60N 2/688 297/354.11 |
| 9,073,453 | B2 * | 7/2015 | Erhel | B60N 2/02 |
| 9,944,396 | B2 * | 4/2018 | Udriste | B64D 11/0646 |
| 10,065,535 | B1 * | 9/2018 | Line | B60N 2/3013 |
| 10,266,271 | B2 * | 4/2019 | Udriste | B60N 2/995 |
| 2004/0032155 | A1 * | 2/2004 | Yamada | B60N 2/3047 297/331 |
| 2004/0256894 | A1 | 12/2004 | McManus et al. | |
| 2006/0103174 | A1 * | 5/2006 | Queveau | B60N 2/3065 297/331 X |
| 2006/0152055 | A1 * | 7/2006 | Yudovich | B60N 2/3047 297/331 |
| 2006/0284464 | A1 * | 12/2006 | Soditch | B60N 2/309 297/331 |
| 2007/0035164 | A1 * | 2/2007 | North | A47C 3/18 297/217.1 |
| 2007/0120409 | A1 * | 5/2007 | Leeds | A47C 27/14 297/423.26 |
| 2008/0012414 | A1 * | 1/2008 | Dewert | A47C 1/0342 297/354.11 |
| 2008/0100112 | A1 * | 5/2008 | Hausler | B60N 2/2209 297/331 |
| 2008/0122279 | A1 * | 5/2008 | Park | B60N 2/0875 297/331 X |
| 2009/0236891 | A1 * | 9/2009 | Ito | B60N 2/929 297/354.12 |
| 2010/0201167 | A1 * | 8/2010 | Wieclawski | B60N 2/2222 297/284.3 X |
| 2011/0272200 | A1 * | 11/2011 | Clapp | A61G 1/02 297/118 X |
| 2013/0045824 | A1 * | 2/2013 | Yin | B60N 2/0232 474/148 |
| 2013/0045825 | A1 * | 2/2013 | Yin | A47C 7/5068 474/150 |
| 2014/0300145 | A1 * | 10/2014 | Beroth | B60N 2/231 297/83 |
| 2015/0008708 | A1 * | 1/2015 | Erhel | B60N 2/2222 297/188.19 |
| 2015/0021969 | A1 * | 1/2015 | Yin | A47C 7/506 297/423.26 |
| 2015/0036060 | A1 * | 2/2015 | Yaghoubi | H04N 5/655 297/354.1 X |
| 2015/0352979 | A1 * | 12/2015 | O'Bannon | B60N 2/806 297/311 X |
| 2016/0101710 | A1 * | 4/2016 | Bonk | B60N 2/0248 297/217.2 |
| 2016/0257313 | A1 * | 9/2016 | Yin | B61D 33/0021 |
| 2017/0225751 | A1 * | 8/2017 | Fuller, IV | B60N 2/995 |
| 2018/0086468 | A1 * | 3/2018 | Beroth | B60N 2/2222 |
| 2018/0105070 | A1 * | 4/2018 | Dry | B60N 3/001 |
| 2018/0105076 | A1 * | 4/2018 | Dry | B60N 2/164 |
| 2018/0105080 | A1 * | 4/2018 | Dry | B60N 2/914 |
| 2018/0222350 | A1 * | 8/2018 | Hirayama | B60N 2/0244 |
| 2018/0251048 | A1 * | 9/2018 | Line | B60N 2/646 |
| 2018/0251050 | A1 * | 9/2018 | Damerow | B60N 2/2222 |
| 2019/0168644 | A1 * | 6/2019 | Kim | B60N 2/04 |
| 2019/0322202 | A1 * | 10/2019 | Hur | B60N 2/995 |
| 2020/0139861 | A1 * | 5/2020 | Nevarez | B64D 11/0639 |
| 2020/0223342 | A1 * | 7/2020 | Ito | B60N 2/995 |
| 2020/0238856 | A1 * | 7/2020 | Palm | B60N 2/12 |
| 2020/0346571 | A1 * | 11/2020 | Casey | B60N 2/995 |
| 2020/0376988 | A1 * | 12/2020 | Cha | B60N 2/22 |
| 2021/0331605 | A1 * | 10/2021 | Lee | G06K 9/00838 |

FOREIGN PATENT DOCUMENTS

| | | | |
|---|---|---|---|
| JP | 3701105 | 9/2005 | |
| JP | 2010154959 | 7/2010 | |
| JP | 2013039352 | 2/2013 | |
| JP | 2018065420 | 4/2018 | |
| WO | WO-2016199919 A1 * | 12/2016 | B60N 2/90 |

* cited by examiner

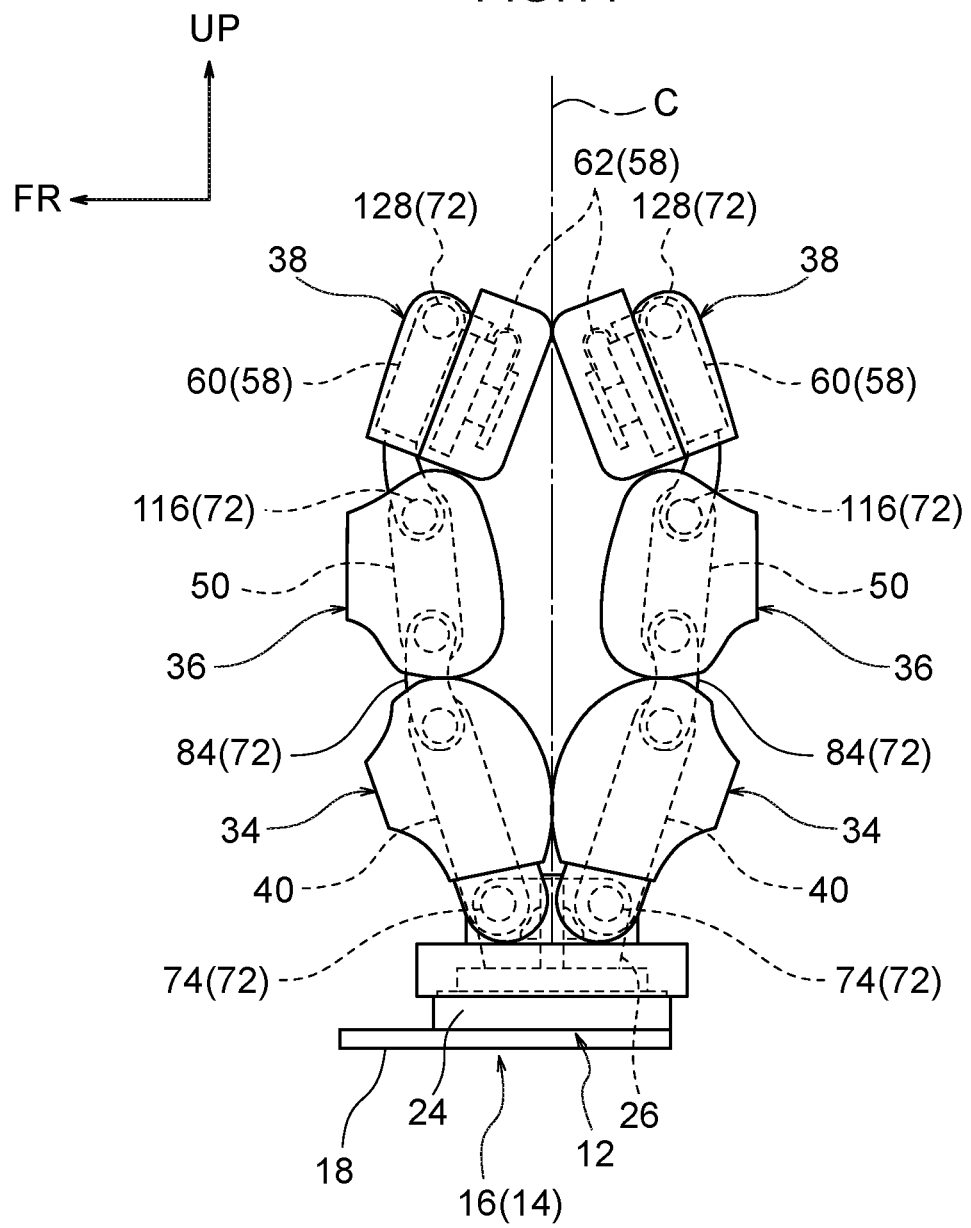

VEHICLE SEAT

CROSS-REFERENCE TO RELATED APPLICATION

This application is based on and claims priority under 35 USC 119 from Japanese Patent Application No. 2019-004684 filed on Jan. 15, 2019, the disclosure of which is incorporated by reference herein.

BACKGROUND

Technical Field

The present disclosure relates to a vehicle seat.

Related Art

Japanese Patent No. 3701105 discloses a sitting direction-reversible seat device. In this sitting direction-reversible seat device, a lower end portion of a seatback section is supported by a base section (base end) of a vehicle seat through a reclining device so as to be capable of tilting. A seat cushion section is supported by a cushion base section through a link mechanism. The cushion base section is supported by the base section of the vehicle seat so as to be capable of tilting.

In this sitting direction-reversible seat device, in a state in which the seatback section has been tilted so as to be disposed substantially horizontally, a link arm of the link mechanism is swung to swing the seat cushion section away from the cushion base section, after which the cushion base section is tilted to an upright position. The front-rear orientation of the seat can thus be thereby reversed.

In the sitting direction-reversible seat device disclosed in Japanese Patent No. 3701105, when the front-rear orientation of the seat is reversed, the seat cushion section is swung away from the cushion base section supported by the base section, thereby exposing the link mechanism. Thus, there is a risk that the hand of an operator might become caught in the link arm of the link mechanism, and so there is room for improvement with respect to improving safety when switching the seat orientation.

SUMMARY

In consideration of the above circumstances, the present disclosure is to obtain a vehicle seat in which the seat orientation is capable of being switched, while increasing safety when the seat orientation is being switched.

A vehicle seat according to a first aspect of the present disclosure includes a base section fixed to a floor of a vehicle, a pair of seat sections that are disposed in opposition to each other as viewed along a seat width direction, that are each supported by the base section so as to be tiltable between a horizontal position and an upright position, and that each include a plurality of cushion sections disposed in series and configured to support a body of an occupant, and a hinge mechanism that attaches the pair of seat sections to the base section such that the seat sections are tiltable, and that couples the plurality of cushion sections together such that the cushion sections are swingable about an axis along the seat width direction.

In the vehicle seat according to the first aspect of the present disclosure, the pair of seat sections are disposed opposing each other as viewed along the seat width direction, and are both supported by the base section so as to be capable of tilting between the horizontal position and the upright position using the hinge mechanism. The plural cushion sections of one of the pair of seat sections are swung so as to tilt the seat section to an angle capable of supporting the lower body of an occupant from the lower side, and form a support face following the lower body of the occupant. The one seat section thereby acts as a seat cushion section. The plural cushion sections of the other of the pair of seat sections are swung so as to tilt the seat section to an angle capable of supporting the upper body of the occupant from the rear side, and form a support face following the upper body of the occupant. The other seat section thereby acts as a seatback section. By adjusting the positions of the pair of seat sections in this manner, the positions of the seat cushion section and the seatback section of the vehicle seat can be reversed, enabling the seat orientation of the vehicle seat to be switched.

Moreover, in the vehicle seat described above, the seat orientation can be switched simply by an operation to tilt the pair of seat sections in predetermined directions with respect to the base section, with the cushion sections configuring the pair of seat sections forming a continuous support face to support the body of the occupant. This suppresses the formation of unwanted gaps between the support faces of the seat sections and the base section while the seat orientation is being switched, thereby preventing a situation in which part of the body of the occupant becomes trapped between the seat sections and the base section.

A vehicle seat according to a second aspect of the present disclosure is the configuration of the first aspect, wherein the plural cushion sections include a lower cushion section that has one end tiltably supported by the base section, and that is configured to support the buttocks or the lower back of an occupant, a middle cushion section that has one end swingably supported by another end of the lower cushion section, and that is configured to support the calves or the upper back of an occupant, and an upper cushion section that has one end swingably supported by another end of the middle cushion section, and that is configured to support the feet or the head of an occupant.

In the vehicle seat according to the second aspect of the present disclosure, the pair of seat sections each include the lower cushion section, the middle cushion section, and the upper cushion section disposed in series. When one of the seat sections configures a seat cushion section, the occupant is supported from their buttocks to their feet by the one seat section. When the other of the seat sections configures a seatback section, the occupant is supported from their back to their head by the other seat section. This configuration in which each of the seat sections is provided with the three cushion sections enables the occupant to be supported from their head to their feet, allowing the occupant to sit in a comfortable posture. This enables the comfort of the occupant while traveling to be increased.

A vehicle seat according to a third aspect of the present disclosure is the configuration of the second aspect, wherein the lower cushion section and the middle cushion section are swingably coupled together by a double hinge mechanism in which one rotation shaft provided at the other end of the lower cushion section and another rotation shaft provided at the one end of the middle cushion section are coupled together via a link.

In the vehicle seat according to the third aspect of the present disclosure, the lower cushion section and the middle cushion section are coupled together through the double hinge mechanism, thereby enabling the two sections to be coupled together so as to be capable of swinging relative to each other while the double hinge mechanism absorbs the thicknesses of the lower cushion section and the middle cushion section. This enables thick pad members to be disposed at the coupling portion between the lower cushion section and the middle cushion section. Thus, the body of the seated occupant can be stably supported despite the lower cushion section and the middle cushion section of each of the seat sections being disposed at positions distanced from the base section, thereby enabling occupant restraint force from the seat sections to be improved.

A vehicle seat according to a fourth aspect of the present disclosure is the configuration of the second aspect, wherein the upper cushion section includes a plate-shaped under-frame configured to support the feet of an occupant when in a footrest position, and a plate-shaped rotatable frame configured to support the head of an occupant when in a headrest position, and the under-frame and the rotatable frame are coupled together so as to be swingable about an axis along the seat width direction.

In the vehicle seat according to the fourth aspect of the present disclosure, by swinging the rotatable frame with respect to the under-frame, the feet of the occupant can be supported by the under-frame when the upper cushion section is in the footrest position, and the head of the occupant can be supported by the rotatable frame when the upper cushion section is in the headrest position. Thus, even in cases in which the tilt angles of the pair of seat sections are reversed so as to switch the seat orientation, the location of the upper cushion section contacted by the feet contact and the location of the upper cushion section contacted by the head can be kept separate, enabling hygiene to be secured. This enables user-friendliness for the occupant to be improved.

A vehicle seat according to a fifth aspect of the present disclosure is the configuration of the first aspect, wherein the hinge mechanism includes plural motors serving as drive sources, and plural shafts that are disposed with axial directions along the seat width direction and that are rotated forward or backward by drive force from the plural motors.

In the vehicle seat according to the fifth aspect of the present disclosure, the swinging actions between the plural cushion sections disposed in series are performed using the plural shafts that are rotated forward or backward by drive force from the plural motors. This enables movement of the plural cushion sections to be smoothly performed, thereby enabling the occupant to be suppressed from feeling discomfort, even when the seat form is switched in a state in which the occupant is seated in the vehicle seat.

A vehicle seat according to a sixth aspect of the present disclosure is the configuration of the first aspect, further including a control device configured to operate the hinge mechanism so as to adopt a state corresponding to a mode selected from a plurality of pre-stored modes.

In the vehicle seat according to the sixth aspect of the present disclosure, the control device operates the hinge mechanism so as adopt a state corresponding to a selected mode out of the plural pre-stored modes. Thus, the occupant is able to adjust their posture in the seat by simply selecting a desired mode from out of the plural modes, thereby enabling adjustment of the seating posture to be performed with great ease.

As described above, the vehicle seat according to the present disclosure enables the seat orientation to be switched, while improving safety when the seat orientation is being switched.

BRIEF DESCRIPTION OF THE DRAWINGS

Exemplary embodiments of the present disclosure will be described in detail based on the following figures, wherein:

FIG. 14 is a side view schematically illustrating a state in which the vehicle seat has been set to a stowed mode.

DETAILED DESCRIPTION

Figure 1:
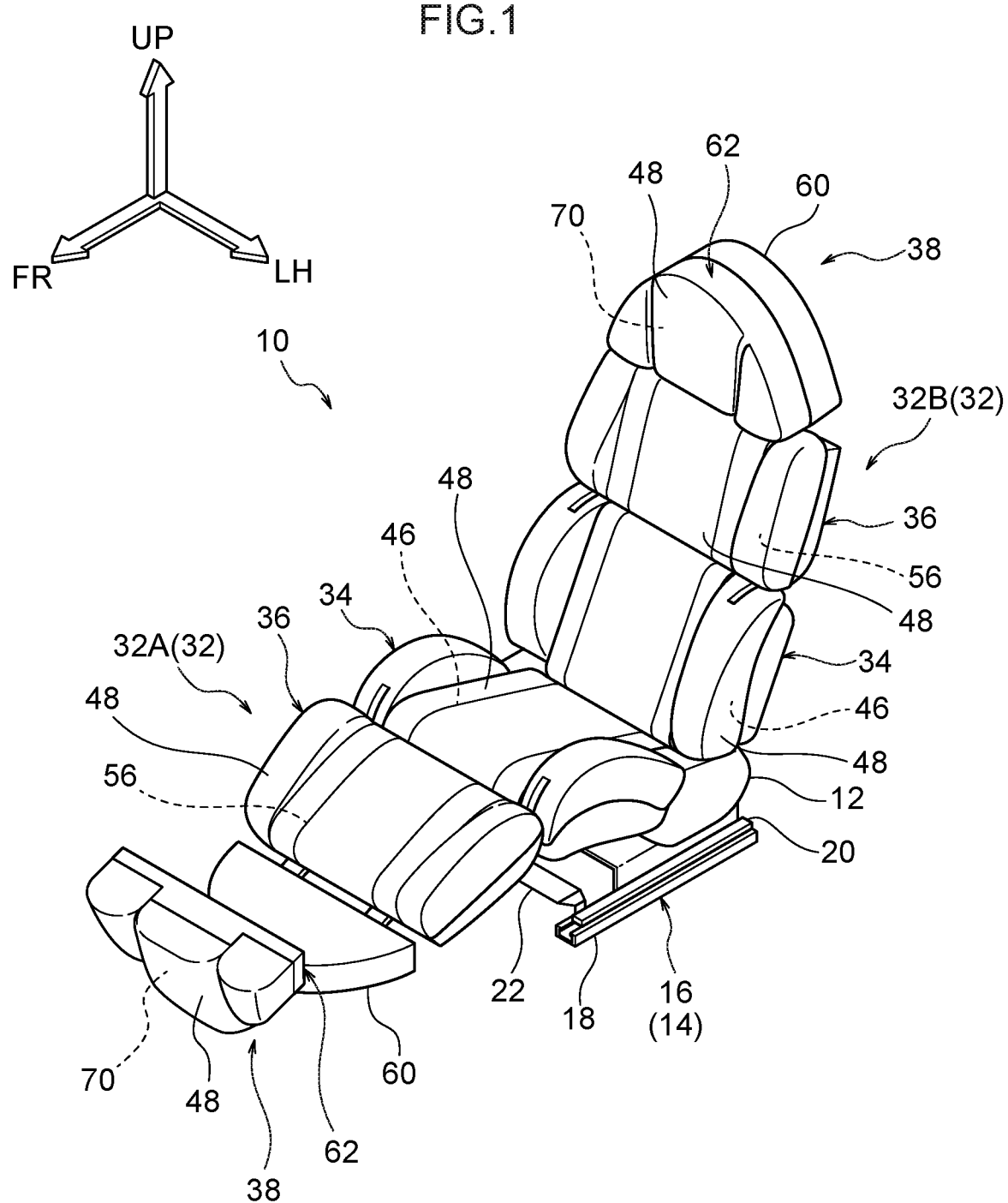
FIG. 1 is a perspective view of a vehicle seat according to an exemplary embodiment of the present disclosure, illustrating a state in which an upper cushion section of a seat section disposed at a seat front-rear direction front side is set to a footrest position, and an upper cushion section of a seat section disposed at a seat front-rear direction rear side is set to a headrest position.

Explanation follows regarding a vehicle seat 10 according to an exemplary embodiment of the present disclosure, with reference to FIG. 1 to FIG. 14. Note that in the drawings, the arrow FR indicates a seat front side of the vehicle seat 10, the arrow UP indicates a seat upper side of the vehicle seat 10, and the arrow LH indicates a seat left side (one side in a seat width direction) of the vehicle seat 10, as appropriate. Unless specifically stated otherwise, in the present exemplary embodiment, the seat front side, seat upper side, and seat left side of the vehicle seat 10 are aligned with the vehicle front side, vehicle upper side, and vehicle left side of a vehicle (automobile) in which the vehicle seat 10 is installed. An occupant P1 illustrated in FIG. 7 and FIG. 9 to FIG. 11 is a male or female of standard build (for example a build equivalent to AM50), and an occupant P2 illustrated in FIG. 12 is a child with a smaller build than the occupant P1. The occupants P1 and P2 are sometimes referred to simply as the occupant P. In the interest of simplicity, some reference numerals may be omitted from the respective drawings.

As illustrated in FIG. 1 to FIG. 7, the vehicle seat 10 includes a base section 12 configuring a lower section of the vehicle seat 10, and a pair of seat sections 32 that are supported by the base section 12 so as to be capable of tilting. Each of the pair of seat sections 32 is configured including a lower cushion section 34, a middle cushion section 36, and an upper cushion section 38 disposed in series, and these sections are coupled together by a hinge mechanism 72 within the seat section 32. The vehicle seat 10 further includes an ECU 140 (see FIG. 6), serving as a control device that controls the hinge mechanism 72. Explanation follows regarding each of these configurations.

Base Section 12

As illustrated in FIG. 1 to FIG. 4, the base section 12 is fixed to a non-illustrated vehicle floor through a slide mechanism 14. The slide mechanism 14 includes a left and right pair of slide rails 16. The left and right slide rails 16 each have a substantially elongated shape with length direction running along the seat front-rear direction, and are disposed side-by-side in a seat width direction. Each of the slide rails 16 is configured including a lower rail 18 and an upper rail 20.

As viewed from the seat front side, the lower rail 18 is formed with a substantially C-shaped cross-section open toward the seat upper side, and extends along the seat front-rear direction. A front end portion and a rear end portion of the lower rail 18 are fixed to the vehicle floor. The upper rail 20 is supported by the lower rail 18 so as to be capable of sliding along the seat front-rear direction. The slide mechanism 14 is configured such that drive force from a slide motor 22, illustrated in FIG. 1, FIG. 2, and FIG. 4, causes the upper rails to 20 slide along the seat front-rear direction with respect to the lower rails 18.

The base section 12 includes a plate 24 fixed to each of the above-described upper rails 20, and a pair of support members 26 projecting perpendicularly toward the seat upper side from both seat width direction sides of the plate 24. The plate 24 is for example formed by pressing a metal sheet, and includes an upper face portion 24A formed in a substantially rectangular shape as viewed from the seat upper side, and side face portions 24B extending from both seat width direction end portions of the upper face portion 24A toward a seat lower side. A fixed flange portion 24C that extends substantially along a horizontal direction is provided to a lower end portion of each of the side face portions 24B. The fixed flange portion 24C is fixed to the corresponding upper rail 20, described above, by fasteners (not allocated reference numerals). The base section 12 is thereby fixed to the vehicle floor (not illustrated in the drawings) through the slide mechanism. Note that the above-described base section 12 may be configured such that the fixed flange portions 24C are directly fixed to the vehicle floor.

The pair of support members 26 are for example each formed by pressing a metal sheet, and project perpendicularly toward the seat upper side from both seat width direction sides of the upper face portion 24A of the plate 24. Each of the support members 26 includes a base end portion 26A extending substantially along the horizontal direction, and an upstand portion 26B projecting perpendicularly toward the seat upper side from one end of the base end portion 26A. The base end portion 26A is fastened to the upper face portion 24A using plural bolts 28 and nuts (not illustrated in the drawings). As viewed along the seat width direction, the upstand portion 26B is formed in a substantially rectangular shape with its length direction along the seat front-rear direction. A pair of coupling portions 30, to which respective first hinge sections 74 of the hinge mechanism 72, described later, are connected, are provided on both seat front-rear direction sides of each of the upstand portions 26B.

Pair of Seat Sections 32

Figure 5:
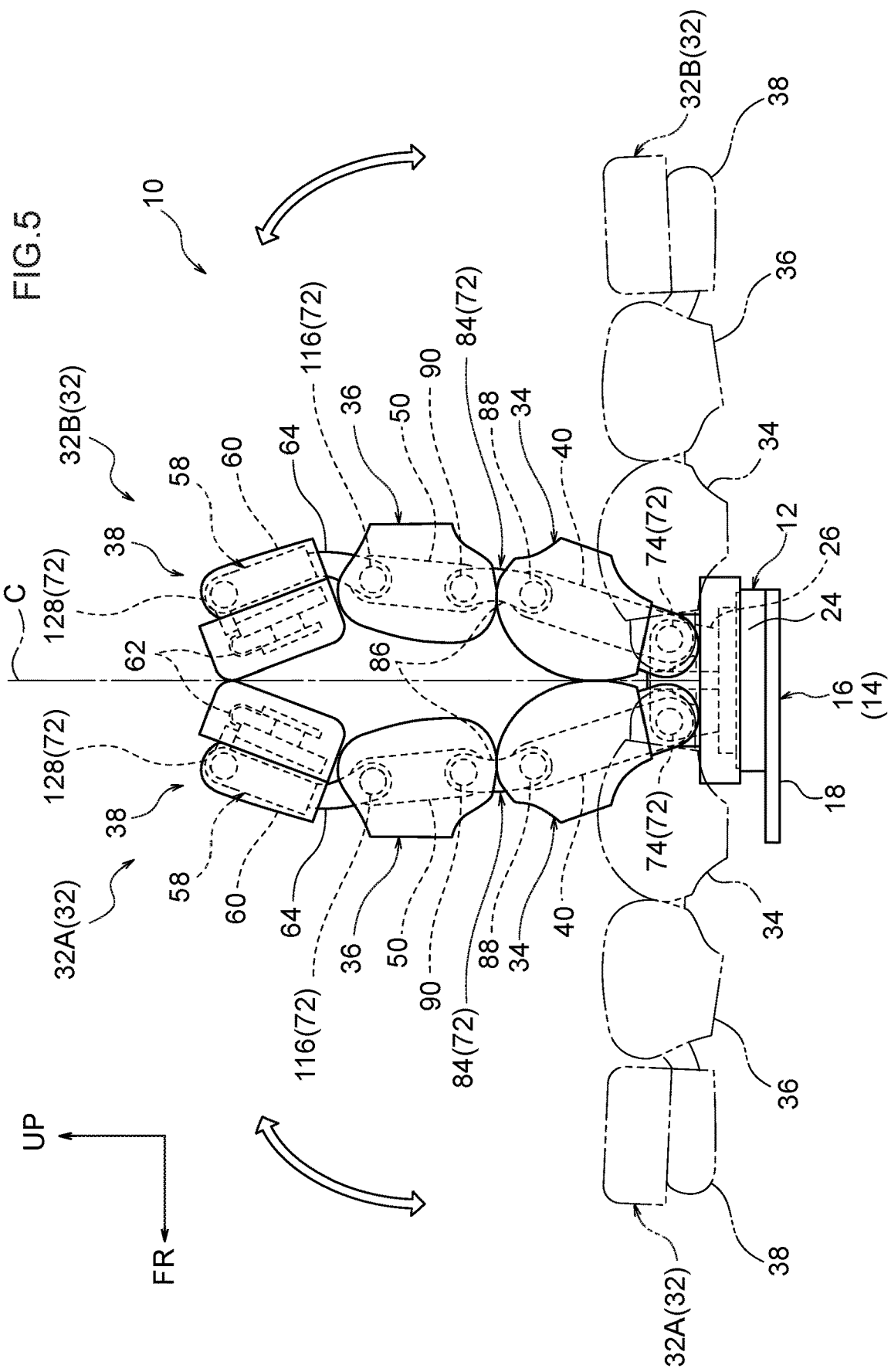
FIG. 5 is a schematic side view illustrating upright positions of seat sections of the vehicle seat using solid lines, and horizontal positions of the seat sections of the vehicle seat using double-dotted dashed lines.

As illustrated in FIG. 1 and FIG. 5, the pair of seat sections 32 are attached to the base section 12 through the first hinge sections 74 of the hinge mechanism 72, described later, and are supported by the base section 12 so as to be capable of tilting. The pair of seat sections 32 include a seat section 32A disposed at the seat front-rear direction front side and a seat section 32B disposed at the seat front-rear direction rear side so as to oppose each other as viewed along the seat width direction. Namely, the seat sections 32A, 32B are configured so as to be structurally symmetrical about the base section 12.

Each of the seat sections 32A, 32B includes the lower cushion section 34, the middle cushion section 36, and the upper cushion section 38 that support the body of the occupant P seated in the vehicle seat 10. These sections are disposed in series in the above sequence on progression from a base end portion toward a leading end portion of the corresponding seat section 32. The lower cushion section 34, the middle cushion section 36, and the upper cushion section 38 are coupled together by the hinge mechanism 72, described later. Note that the lower cushion section 34, the middle cushion section 36, and the upper cushion section 38 correspond to plural cushion sections of the present disclosure.

Lower Cushion Section 34

Figure 2:
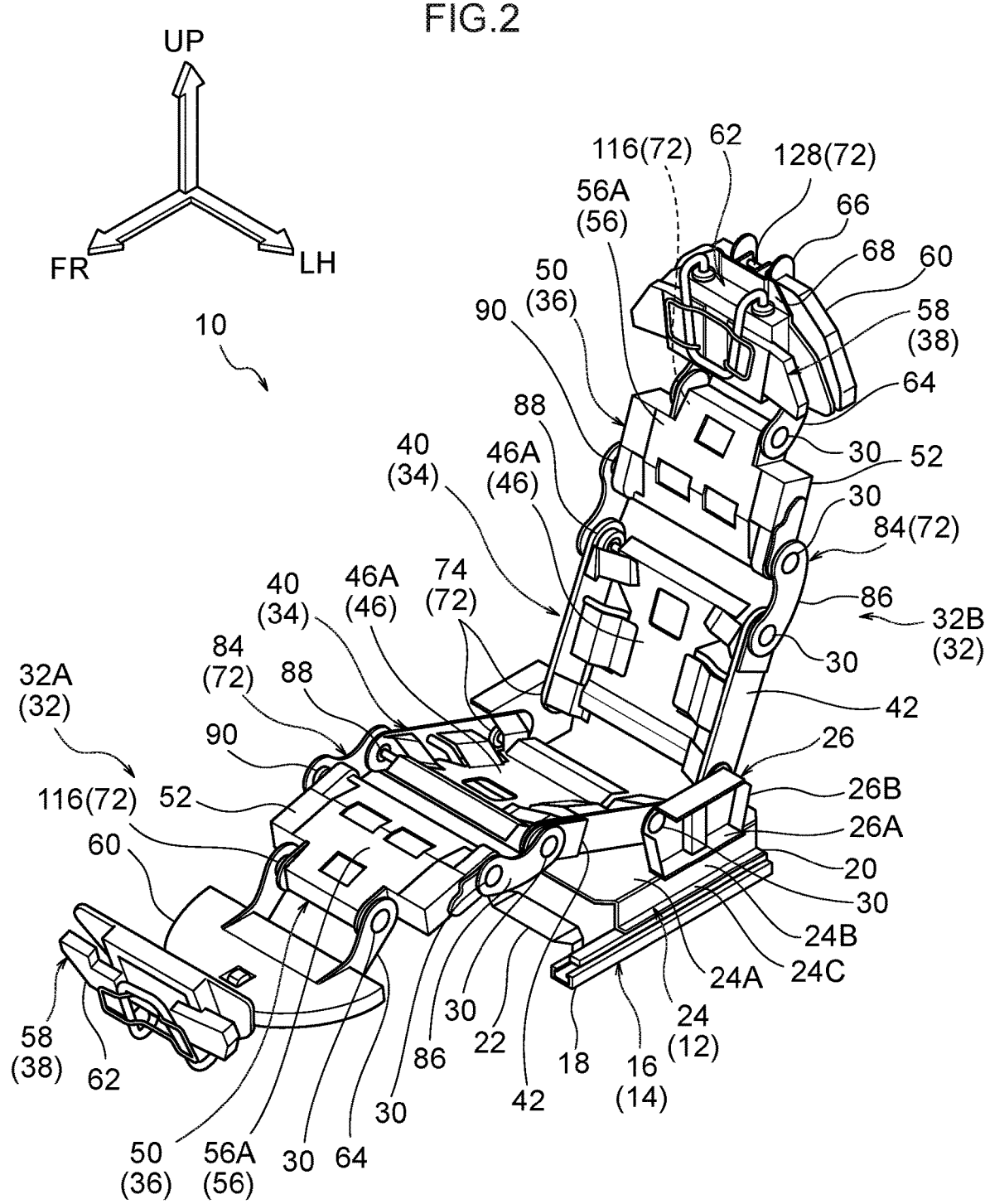
FIG. 2 is a perspective view corresponding to FIG. 1, illustrating framework members of the vehicle seat.
Figure 3:
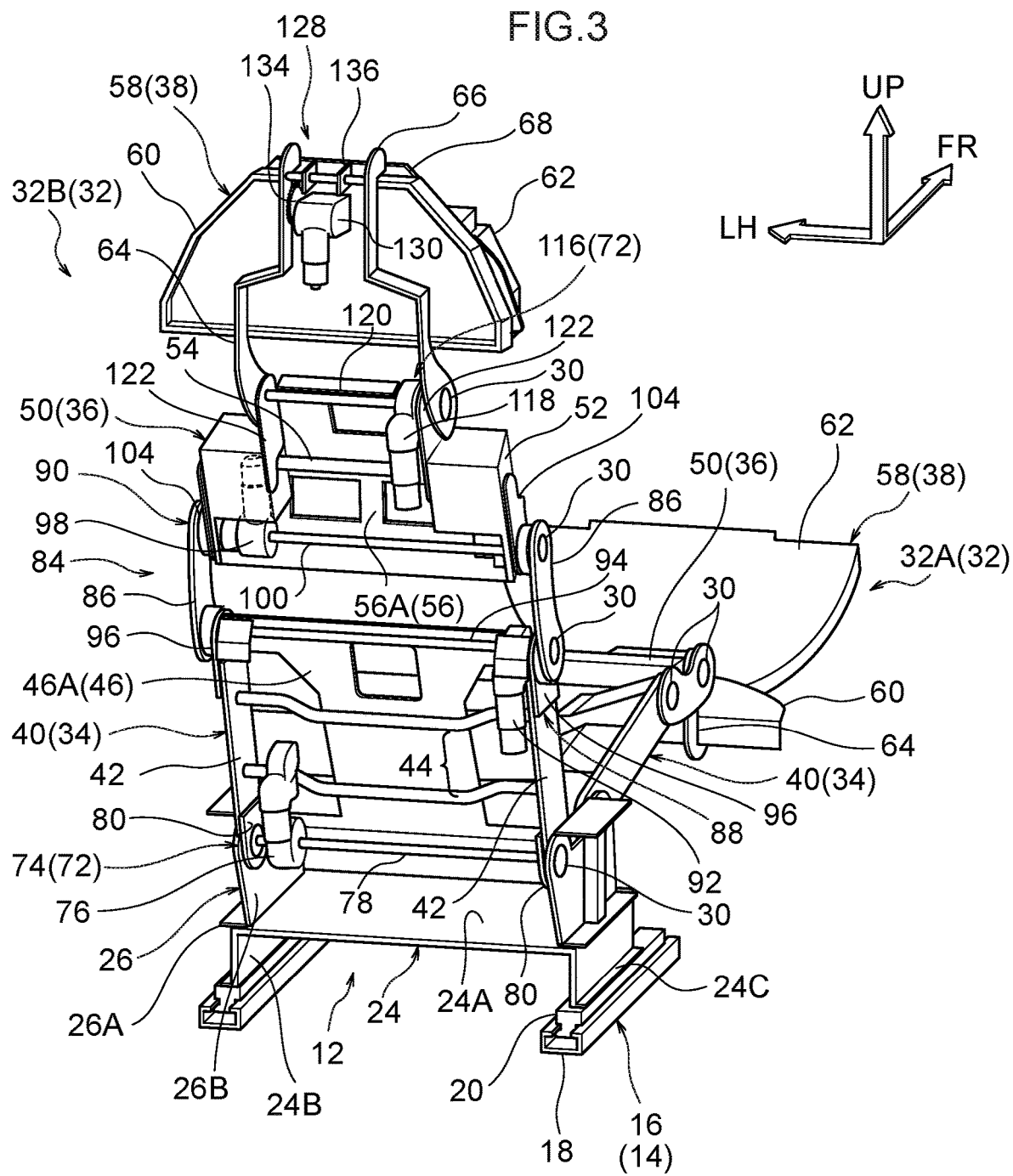
FIG. 3 is a perspective view illustrating framework members of the vehicle seat as viewed from a seat rear side.
Figure 4:
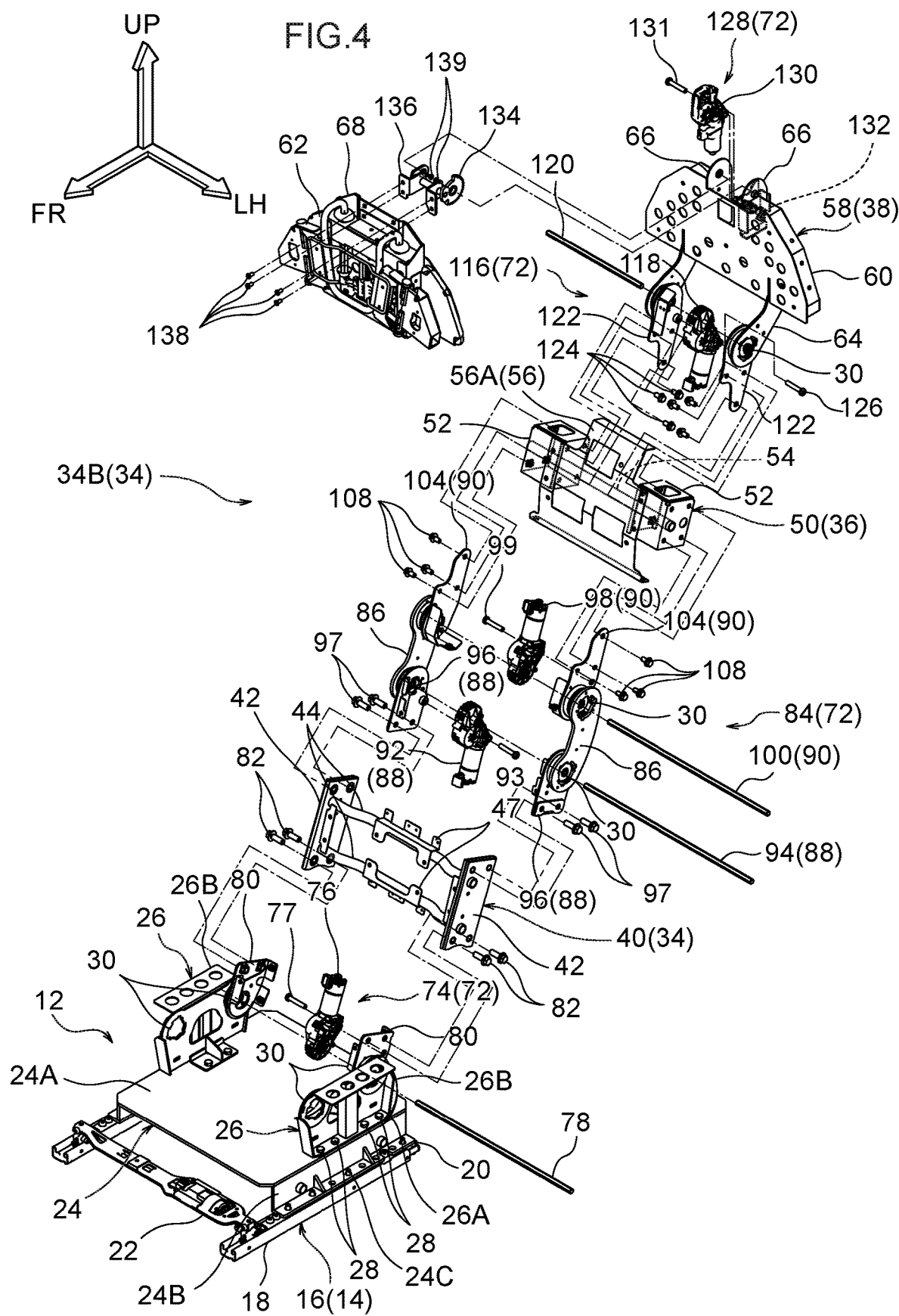
FIG. 4 is an exploded perspective view to explain the structure of seat sections of the vehicle seat.

As illustrated in FIG. 2 to FIG. 4, each of the lower cushion sections 34 includes a lower frame 40 configuring a frame (framework member) of the lower cushion section 34. The lower frame 40 includes a left and right pair of lower side frames 42. Each of the left and right lower side frames 42 is for example formed by pressing a metal sheet, forms an elongated shape with its length direction running along a direction orthogonal to the seat width direction, and is disposed with its plate thickness direction in the seat width direction. One length direction end of each of the left and right lower side frames 42 is coupled to the corresponding coupling portion 30 of the base section 12 through the first hinge section 74 of the hinge mechanism 72, described later, so as to be capable of swinging. The other length direction end of each of the left and right lower side frames 42 is coupled to the middle cushion section 36 through a second hinge section 84 of the hinge mechanism 72, described later, so as to be capable of swinging.

The lower frame 40 also includes a pair of support frames 44. The pair of support frames 44 are for example each formed from a metal pipe, and are disposed parallel to each other with their axial directions (length directions) along the seat width direction. The two length direction end portions of each of the pair of support frames 44 are joined to the left and right lower side frames 42 such that the support frames 44 span therebetween.

As illustrated in FIG. 1, a lower pad 46 is provided on a seat front face side of the lower frame 40. The lower pad 46 is configured by a foamed material such as urethane, and is covered by a cover 48. A lower cushion pan 46A, formed by for example pressing a metal sheet, is provided on a seat back face side of the lower pad 46. The lower cushion pan 46A is fixed to the lower frame 40 through fixing frames 47 fixed to the above-described support frames 44. The lower cushion section 34 with the above configuration is configured such that the lower pad 46 including the lower cushion pan 46A supports the body of the occupant P seated on the vehicle seat 10.

Middle Cushion Section 36

The middle cushion section 36 includes a middle frame 50 configuring a frame (framework member) of the middle cushion section 36. The middle frame 50 includes a left and right pair of middle side frames 52. The left and right middle side frames 52 are each formed in a hollow rectangular box shape, and are coupled together in the seat width direction by a single coupling frame 54 disposed with its length direction along the seat width direction. The coupling frame 54 is for example formed from a metal pipe. Seat width direction outer faces of the left and right middle side frames 52 are coupled to the above-described lower side frames 42 through the second hinge section 84 of the hinge mechanism 72, described later, so as to be capable of swinging. Seat width direction inner faces of the left and right middle side frames 52 are coupled to the upper cushion section 38 through a third hinge section 116 of the hinge mechanism 72, described later, so as to be capable of swinging.

As illustrated in FIG. 1, a middle pad 56 is provided to a seat front face side of the middle frame 50. The middle pad 56 is configured by a foamed material such as urethane, and is covered by a cover 48. A middle cushion pan 56A, formed by for example pressing a metal sheet, is provided on a seat back face side of the middle pad 56. The middle cushion pan 56A is fixed to side faces on the seat front face side of the middle side frames 52. The middle cushion section 36 with the above configuration is configured such that the middle pad 56 including the middle cushion pan 56A supports the body of the occupant P seated on the vehicle seat 10.

Upper Cushion Section 38

The upper cushion section 38 includes an upper frame 58 configuring a frame (framework member) of the upper cushion section 38. The upper frame 58 includes an under-frame 60 disposed at a seat back face side of the upper frame 58, and a rotatable frame 62 supported by the under-frame 60 so as to be capable of swinging. The under-frame 60 is for example formed by pressing a metal sheet, and is formed with a substantially triangular plate shaped body. A pair of coupling brackets 64 are provided extending toward the middle cushion section 36 at a base end portion (at the base of the triangular shape) of the under-frame 60. Each of the coupling brackets 64 is formed in an elongated shape with its plate thickness direction along the seat width direction. Coupling portions 30 that are coupled to the third hinge section 116 of the hinge mechanism 72, described later, are provided at leading end portions of the coupling brackets 64. The under-frame 60 is supported by the middle side frames 52 of the middle cushion section 36 through the third hinge section 116 so as to be capable of swinging. A transforming hinge section 128 of the hinge mechanism 72, described later, is provided between a pair of fixing plates 66 projecting perpendicularly toward the leading end side of the under-frame 60 at a leading end portion (at the apex of the triangular shape) of the under-frame 60.

Similarly to the under-frame 60, the rotatable frame 62 is formed with a substantially triangular plate shaped body. A support plate 68 is disposed projecting perpendicularly toward a leading end portion side of the rotatable frame 62 at the leading end portion (at the apex of the triangular shape) of the rotatable frame 62. The rotatable frame 62 and the transforming hinge section 128 are coupled together through the support plate 68. The rotatable frame 62 is thereby coupled to the under-frame 60 through the transforming hinge section 128 of the hinge mechanism 72, described later, so as to be capable of swinging. An upper pad 70 configured by a foamed material such as urethane is disposed on one side face of the rotatable frame 62, and is covered by a cover 48.

In the upper cushion section 38 with the above configuration, the upper cushion section 38 can be transformed between a headrest position and a footrest position by swinging the rotatable frame 62 with respect to the under-frame 60. As illustrated by the upper cushion section 38 of the seat section 32B disposed at the seat front-rear direction rear side of the vehicle seat 10 in FIG. 1, the headrest position corresponds to a state in which the rotatable frame 62 is superimposed on the under-frame 60. In this state, the upper pad 70 of the rotatable frame 62 is disposed at the seat front face side of the upper cushion section 38. This is a configuration in which the upper pad 70 supports the head of the occupant P (see FIG. 7 and FIG. 9 to FIG. 11). As illustrated by the upper cushion section 38 of the seat section 32A disposed opposing the seat section 32B in FIG. 1, the footrest position corresponds to a state in which the rotatable frame 62 has been swung in a direction away from the under-frame 60. In this state, the under-frame 60 is disposed at the seat front face side of the upper cushion section 38. The under-frame 60 is configured to support the feet of the occupant P (see FIG. 7 and FIG. 9 to FIG. 11).

Hinge Mechanism 72

As illustrated in FIG. 2 to FIG. 6, the hinge mechanism 72 is configured including the first hinge sections 74, the second hinge sections 84, the third hinge sections 116, the transforming hinge sections 128, and the ECU 140.

First Hinge Section

As illustrated in FIG. 2 to FIG. 4, the first hinge sections 74 are disposed between the base section 12 and the respective seat sections 32 (lower cushion sections 34) of the vehicle seat 10, and couples these sections together. Each of the first hinge sections 74 is configured by a known power reclining mechanism, and includes a first motor 76 configuring a drive source, a first shaft 78 configuring an output shaft of the first motor 76, and a pair of swingable brackets 80 that are coupled together in the seat width direction by the first shaft 78 and are supported by the base section 12 so as to be capable of swinging.

The first motor 76 is fastened and fixed to a seat width direction inner side of one of the swingable brackets 80 using a motor bolt 77 and a non-illustrated nut. The first shaft 78 is disposed with its axial direction along the seat width direction, and both axial direction end portions of the first shaft 78 are fixed to the pair of swingable brackets 80. Each of the pair of swingable brackets 80 is for example formed by pressing a metal sheet, and is disposed with its plate thickness direction along the seat width direction. Lower end portions of the pair of swingable brackets 80 are supported by the coupling portions 30 provided at both left and right seat width direction sides of the base section 12 so as to be capable of swinging. Upper end portions of the pair of swingable brackets 80 are fastened and fixed to the one length direction ends of the left and right pair of lower side frames 42 of the lower cushion section 34 using a pair of bolts 82 and a non-illustrated pair of nuts on each side.

Thus, in the first hinge section 74 with the above configuration, the first shaft 78 configuring the output shaft of the first motor 76 is rotated forward or backward by operation of the first motor 76. The swingable brackets 80 are rotationally driven through the first shaft 78 so as to swing with respect to the base section 12. Thus, the lower cushion section 34 coupled to the base section 12 through the swingable brackets 80 tilts about an axis running along the seat width direction relative to the base section 12 (see the arrow R1 direction in FIG. 7).

Second Hinge Section 84

The second hinge sections 84 are disposed between the lower cushion section 34 and the middle cushion section 36 of each seat section 32, and couples these sections together. Each of the second hinge sections 84 includes a pair of links 86 disposed on both seat width direction sides of the seat section 32, a lower reclining mechanism 88 provided at one end of the links 86, and an upper reclining mechanism 90 provided at the other end of the links 86. Each of the links 86 is for example formed by pressing a metal sheet, forms an elongated shape with its length direction running along a direction orthogonal to the seat width direction, and is disposed with its plate thickness direction along the seat width direction. Coupling portions 30 used to couple the lower reclining mechanism 88 and the upper reclining mechanism 90 together are provided at both length direction end portions of each of the links 86.

Similarly to the first hinge section 74 described above, the lower reclining mechanism 88 is a known power reclining mechanism. The lower reclining mechanism 88 is configured including a second motor 92 configuring a drive source, a second shaft 94 configuring an output shaft of the second motor 92, and a pair of swingable brackets 96 coupled together in the seat width direction by the second shaft 94. Each of the pair of swingable brackets 96 is for example formed by pressing a metal sheet, and is disposed with its plate thickness direction along the seat width direction. One ends of the pair of swingable brackets 96 are fastened and fixed to the other length direction ends of the left and right pair of lower side frames 42 of the lower cushion section 34 using a pair of bolts 97 and a non-illustrated pair of nuts on each side. Other ends of the pair of swingable brackets 96 are supported by the coupling portions 30 provided at the one length direction ends of the left and right pair of links 86 so as to be capable of swinging. The second motor 92 is fastened and fixed to a seat width direction inner side of one out of the pair of swingable brackets 96 using a motor bolt 93 and a non-illustrated nut.

Similarly to the lower reclining mechanism 88 described above, the upper reclining mechanism 90 is a known power reclining mechanism. The upper reclining mechanism 90 is configured including a third motor 98 configuring a drive source, a third shaft 100 configuring an output shaft of the third motor 98, and a pair of swingable brackets 104 coupled together in the seat width direction by the third shaft 100. Each of the pair of swingable brackets 104 is for example formed by pressing a metal sheet, and is disposed with its plate thickness direction along the seat width direction. One ends of the pair of swingable brackets 104 are fastened and fixed to the seat width direction outer faces of the left and right middle side frames 52 of the middle cushion section 36 using three bolts 108 and three non-illustrated nuts on each side. Other ends of the pair of swingable brackets 104 are supported by the coupling portions 30 provided at the other length direction ends of the left and right pair of links 86 so as to be capable of swinging. The third motor 98 is fastened and fixed to a seat width direction inner side of one out of the pair of swingable brackets 104 using a motor bolt 99 and a non-illustrated nut.

Thus, in the second hinge section 84 with the above configuration, the second shaft 94 configuring the output shaft of the second motor 92 is rotated forward or backward by operation of the second motor 92. The links 86 coupled to the swingable brackets 96 are rotationally driven through the second shaft 94, so as to swing relative to the lower cushion section 34 (see the arrow R2 in FIG. 7).

Moreover, the third shaft 100 configuring the output shaft of the third motor 98 is rotated forward or backward by operation of the third motor 98. The swingable brackets 104 are rotationally driven through the third shaft 100 so as to swing relative to the links 86. Thus, the middle cushion section 36 coupled to the links 86 through the swingable brackets 104 swings about an axis running along the seat width direction with respect to the links 86 (see the arrow R3 direction in FIG. 7).

In this manner, the second hinge section 84 is configured by a double hinge mechanism in which the second shaft 94, serving as one rotation shaft provided at one end of the lower cushion section 34, and the third shaft 100, serving as another rotation shaft provided at one end of the middle cushion section 36, are coupled together through the links 86. This enables the middle cushion section 36 to swing about a seat width direction axis with respect to the lower cushion section 34, while the thicknesses of the lower cushion section 34 and the middle cushion section 36 are absorbed by the second hinge section 84.

Third Hinge Section 116

The third hinge section 116 is disposed between the middle cushion section 36 and the upper cushion section 38 of the seat section 32 and couples these sections together. Similarly to the first hinge section 74 described above, the third hinge section 116 is configured by a known power reclining mechanism. The third hinge section 116 is configured including a fourth motor 118 configuring a drive source, a fourth shaft 120 configuring an output shaft of the fourth motor 118, and a pair of swingable brackets 122 coupled together in the seat width direction by the fourth shaft 120.

Each of the pair of swingable brackets 122 is for example formed by pressing a metal sheet, and is disposed with its plate thickness direction along the seat width direction. One ends of the pair of swingable brackets 122 are fastened and fixed to seat width direction inner faces of the left and right middle side frames 52 of the middle cushion section 36 using three bolts 124 and three non-illustrated nuts on each side. Other ends of the pair of swingable brackets 122 are supported by the coupling portions 30 of the left and right pair of coupling brackets 64, provided to the under-frame 60 of the upper cushion section 38, so as to be capable of swinging. The fourth motor 118 is fastened and fixed to a seat width direction inner side of one out of the pair of swingable brackets 122 using a motor bolt 126 and a non-illustrated nut.

Thus, in the third hinge section 116 with the above configuration, the fourth shaft 120 configuring the output shaft of the fourth motor 118 is rotated forward or backward by operation of the fourth motor 118. The swingable brackets 122 are rotationally driven through the fourth shaft 120 so as to swing with respect to the middle cushion section 36. Thus, the upper cushion section 38 coupled to the middle cushion section 36 through the swingable brackets 122 tilts about a seat width direction axis with respect to the middle cushion section 36 (see the arrow R4 direction in FIG. 7).

Transforming Hinge Section 128

As illustrated in FIG. 4, the transforming hinge section 128 is coupled to the under-frame 60 and the rotatable frame 62 of the upper cushion section 38 so as to be capable of swinging. The transforming hinge section 128 includes a fifth motor 130 configuring a drive source, a pinion gear 132 configuring an output shaft of the fifth motor 130, a sector gear 134 that meshes with the pinion gear 132, and a gear bracket 136 that fixes and supports the sector gear 134. The fifth motor 130 is fastened and fixed to a seat width direction inner side of one of the fixing plates 66 projecting perpendicularly from the leading end portion of the under-frame 60 using a motor bolt 131 and a non-illustrated nut.

The pinion gear 132 configuring the output shaft of the fifth motor 130 is disposed with its axial direction along the seat width direction. A gear wheel formed at a leading end of the pinion gear 132 meshes with a gear wheel of the sector gear 134.

The sector gear 134 is disposed with its axial direction along the seat width direction, and is fixed to and supported by the gear bracket 136. The gear bracket 136 is for example formed by pressing a metal sheet, and is fastened and fixed to the support plate 68 of the rotatable frame 62 using plural bolts 138 and plural non-illustrated nuts. The sector gear 134 and one end of the gear bracket 136 are supported so as to be capable of swinging by the pair of fixing plates 66 of the under-frame 60 using a pair of pins 139.

Thus, in the transforming hinge section 128 with the above configuration, the sector gear 134 is rotated forward or backward through the pinion gear 132 configuring the output shaft of the fifth motor 130 by operation of the fifth motor 130. The gear bracket 136 is rotationally driven through the sector gear 134, such that the gear bracket 136 swings with respect to the under-frame 60. Thus, the rotatable frame 62 coupled to the under-frame 60 through the gear bracket 136 swings about an axis running along the seat width direction (see the arrow R5 direction in FIG. 7).

In the vehicle seat 10 with the above configuration, the seat section 32 is supported by the base section 12 so as to be capable of tilting between an "upright position", illustrated by solid lines in FIG. 5, and a "horizontal position", illustrated by double-dotted dashed lines in FIG. 5, under the control of the ECU 140, described later. Note that the "upright position" refers to a state in which the seat section 32 extends substantially along a vertical direction along a center line C running along a seat up-down direction of the base section 12 when the lower cushion section 34, the middle cushion section 36, and the upper cushion section 38 of the seat section 32 are disposed along a straight line. The "horizontal position" refers to a state in which the seat section 32 extends substantially along the horizontal direction.

The vehicle seat 10 enables the seat form to be switched between plural modes, described later, by swinging the lower cushion section 34, the middle cushion section 36, and the upper cushion section 38 of each of the seat sections 32 about the respective axes running along the seat width direction.

ECU 140

Figure 6:
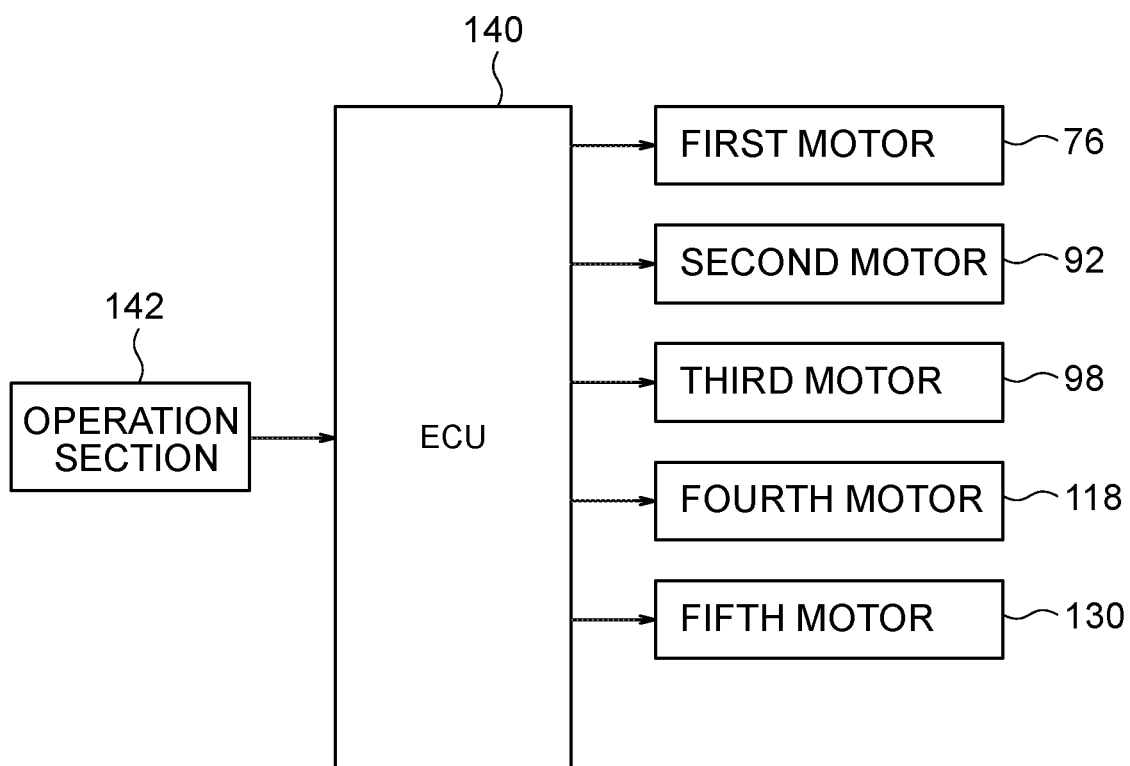
FIG. 6 is a block diagram illustrating a control system of the vehicle seat.

The electronic control unit (ECU) 140 illustrated in FIG. 6 is configured by a micro-computer in which a CPU, ROM, RAM, and an input/output interface (I/O) are connected together through a bus. The first motor 76, the second motor 92, the third motor 98, the fourth motor 118, and the fifth motor 130 previously described are electrically connected to the I/O of the ECU 140. An operation section 142 provided close to the vehicle seat 10 is also electrically connected to the I/O of the ECU 140.

In addition to switches for driving the first motor 76, the second motor 92, the third motor 98, the fourth motor 118, and the fifth motor 130, a mode selection switch is also provided to the operation section 142. The mode selection switch is a switch for selecting a desired mode out of plural (various) modes pre-stored in the ROM of the ECU 140. The ECU 140 is configured to control driving of the first motor 76, the second motor 92, the third motor 98, the fourth motor 118, and the fifth motor 130 according to the mode selected using the mode selection switch.

Figure 7:
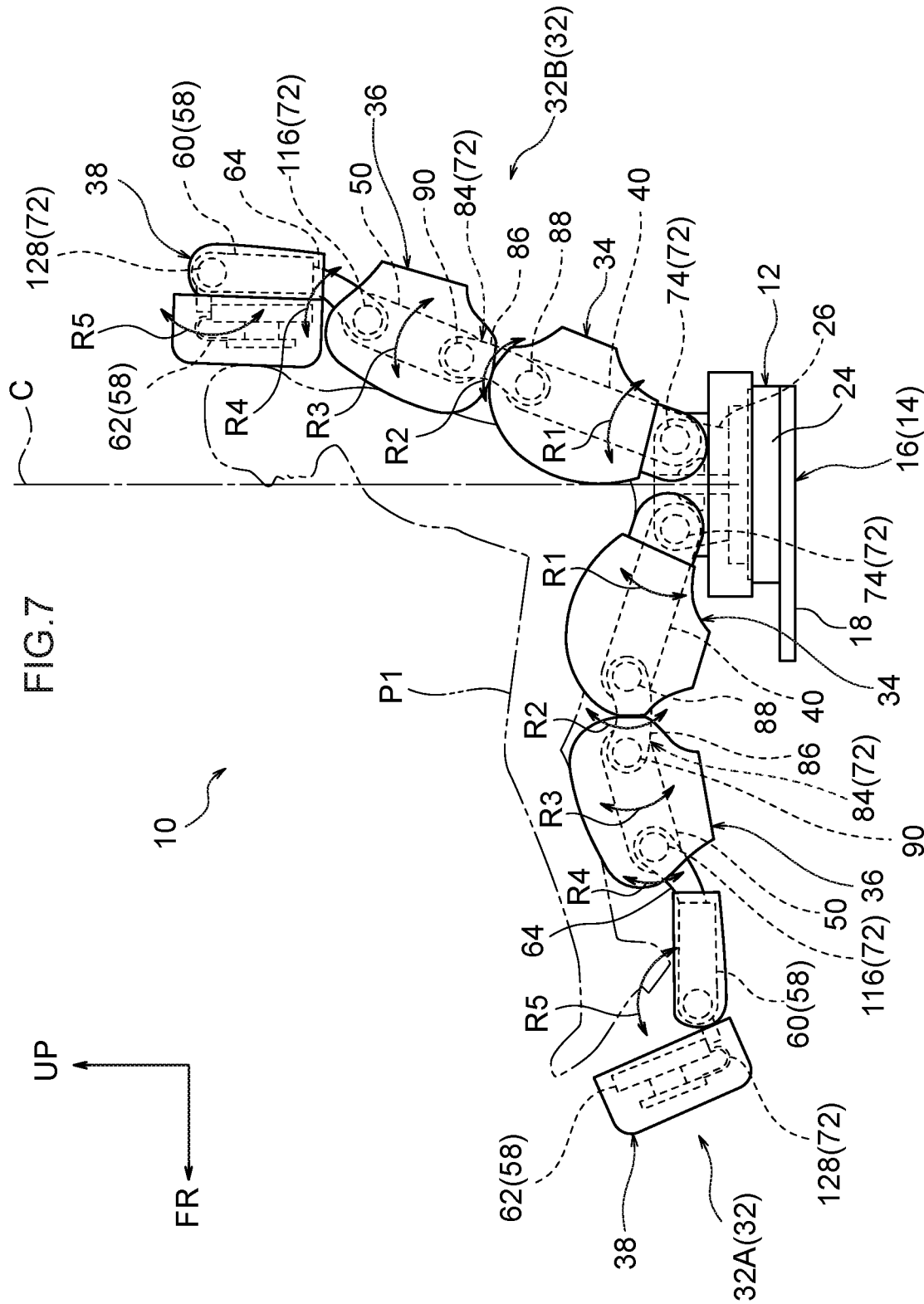
FIG. 7 is a side view schematically illustrating a state in which the vehicle seat has been set to a driving mode.
Figure 8:
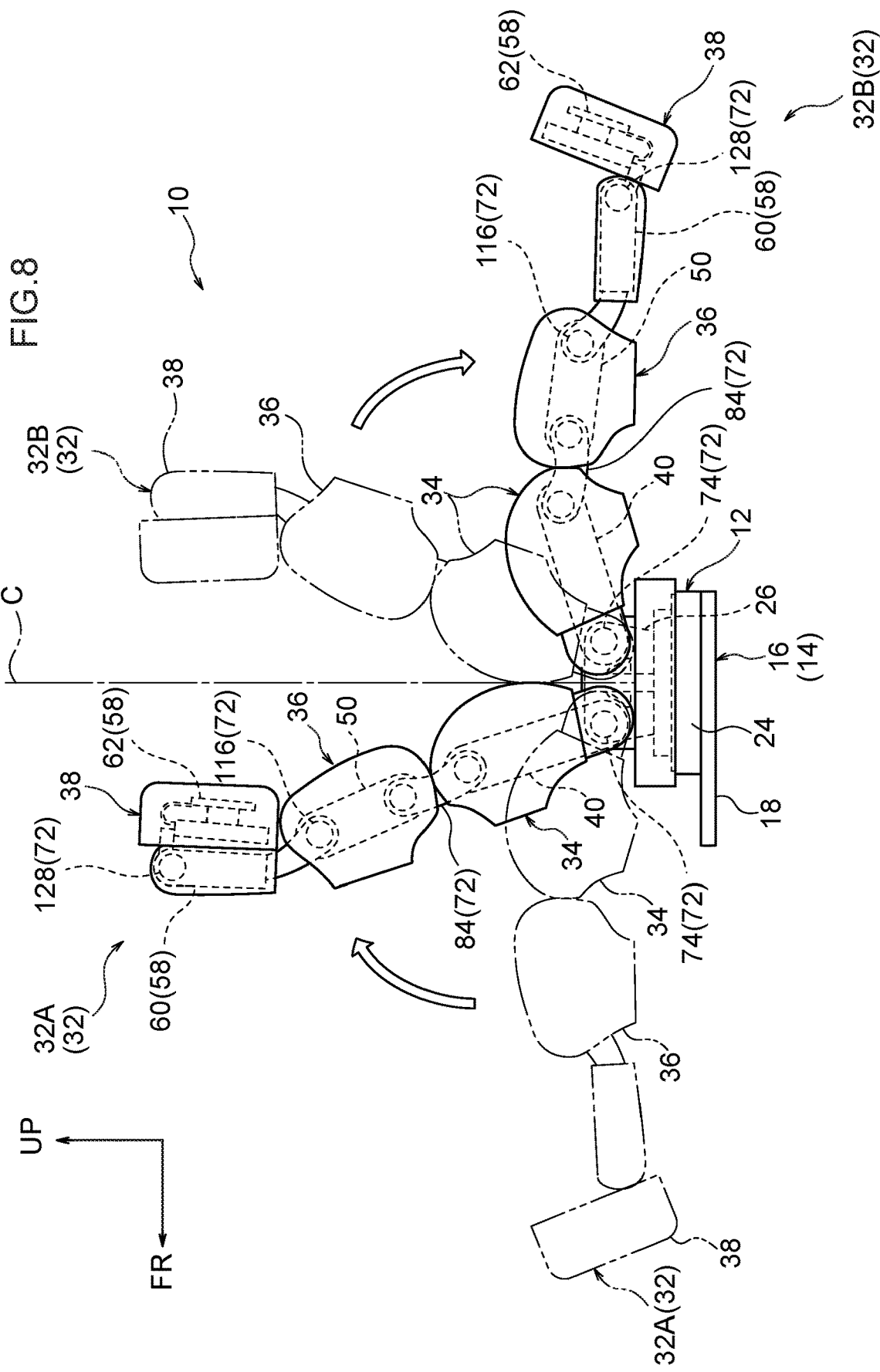
FIG. 8 is a side view schematically illustrating a state in which the vehicle seat has been set to an face-to-face mode using solid lines, and a state in which the vehicle seat has been set to a driving mode using double-dotted dashed lines.
Figure 9:
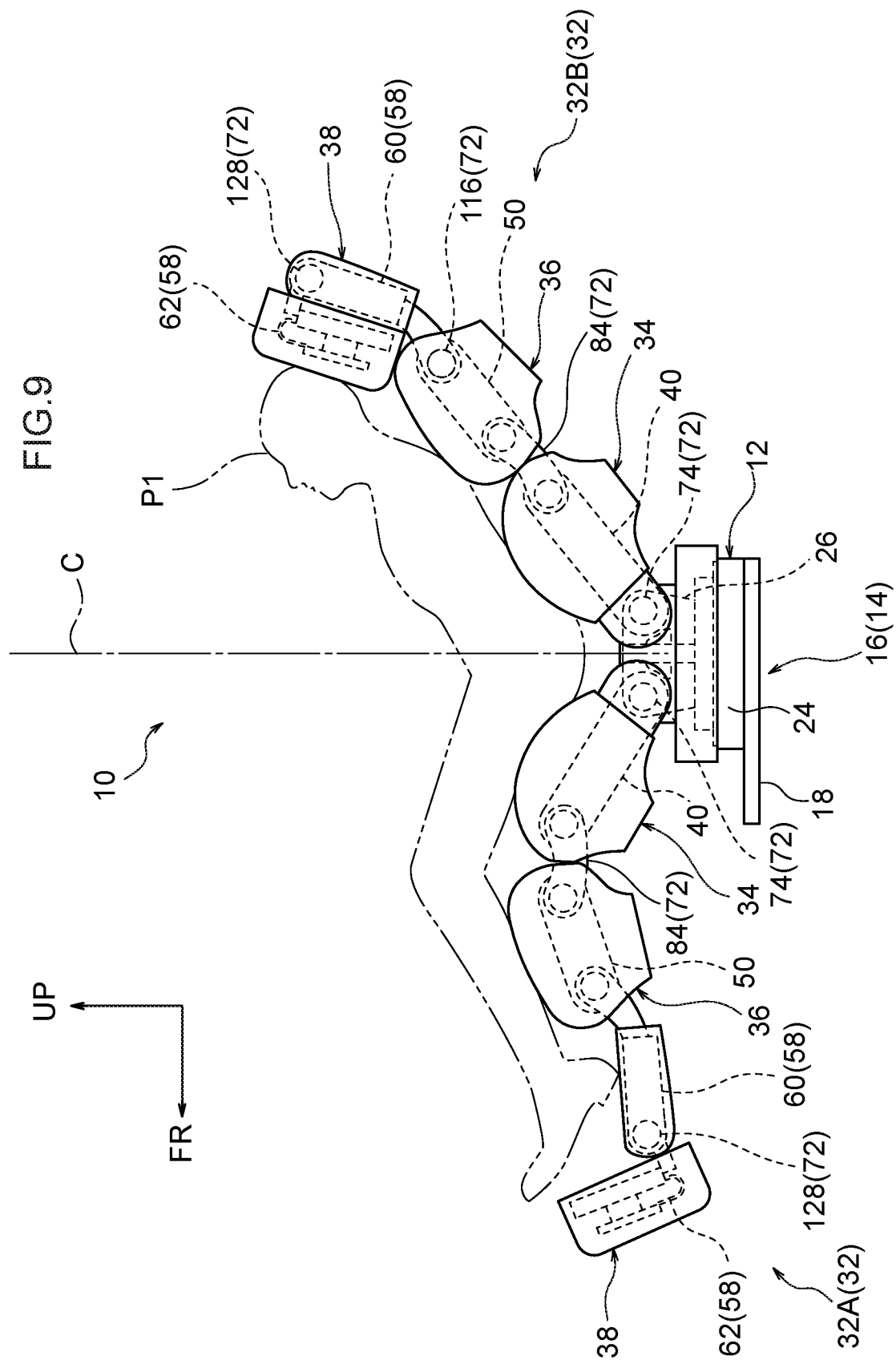
FIG. 9 is a side view schematically illustrating a state in which the vehicle seat has been set to a relax mode.
Figure 10:
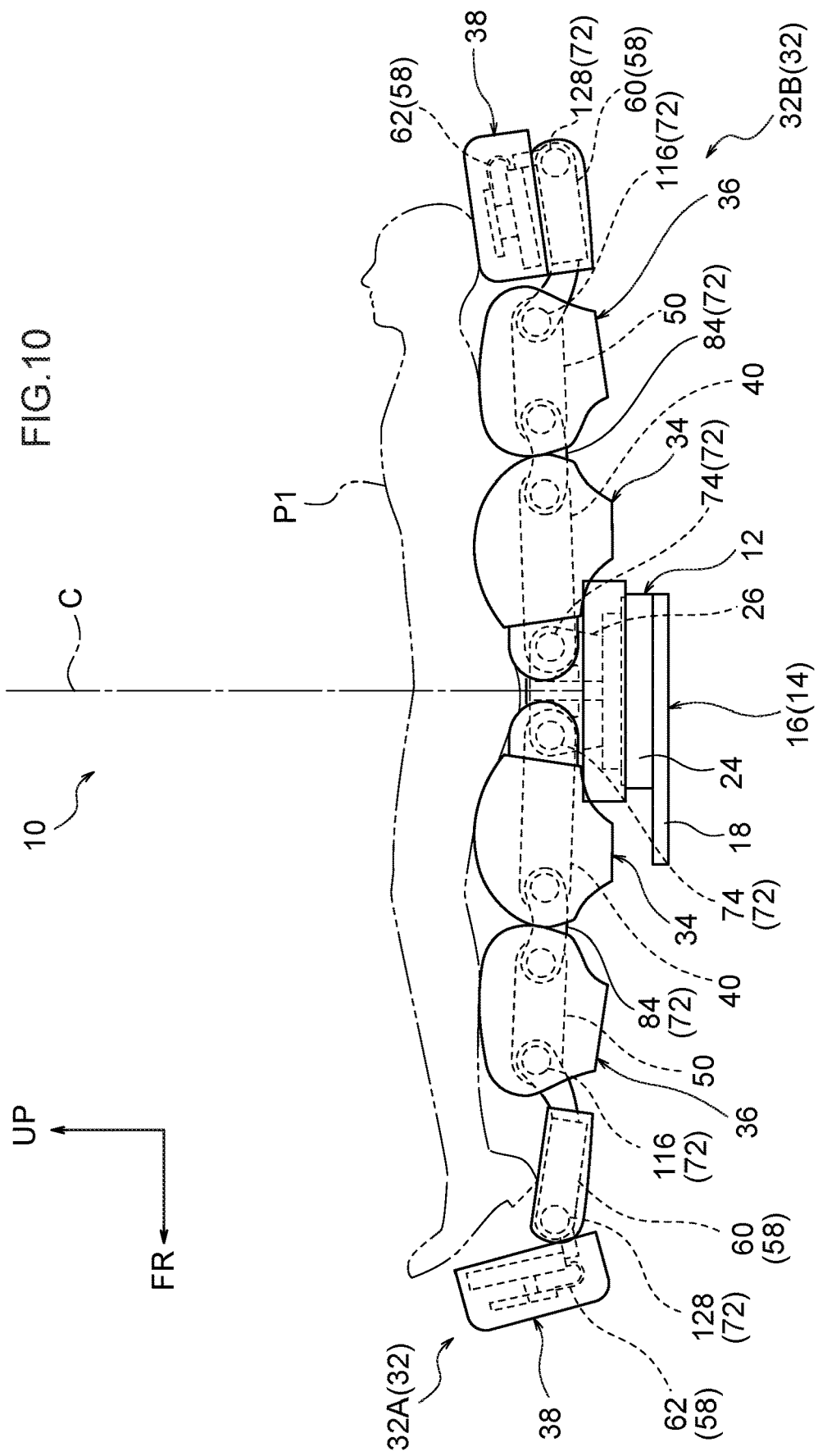
FIG. 10 is a side view schematically illustrating a state in which the vehicle seat has been set to a sleep mode.
Figure 11:
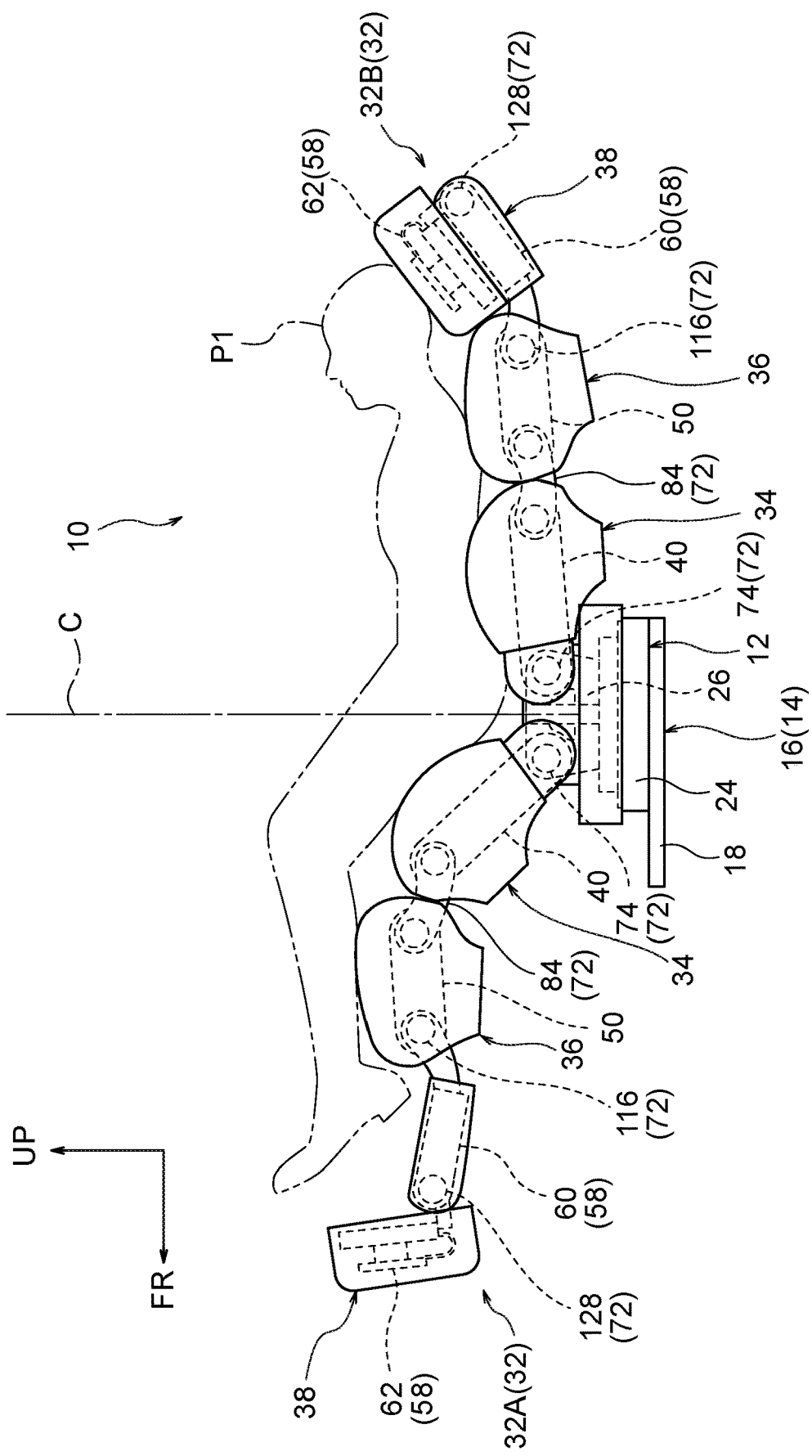
FIG. 11 is a side view schematically illustrating a state in which the vehicle seat has been set to a circulation-boosting mode.
Figure 12:
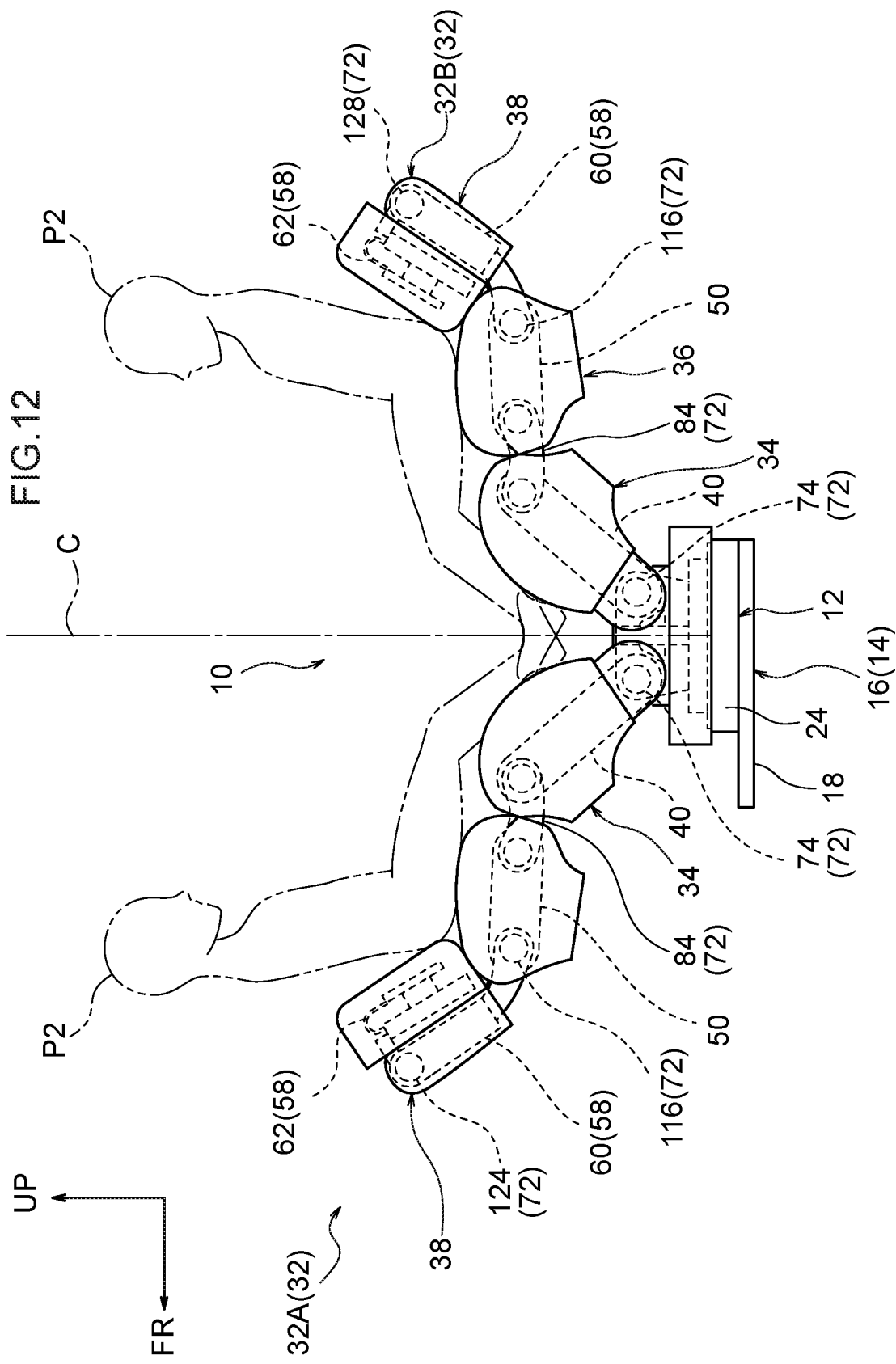
FIG. 12 is a side view schematically illustrating a state in which the vehicle seat has been set to a child mode.
Figure 13:
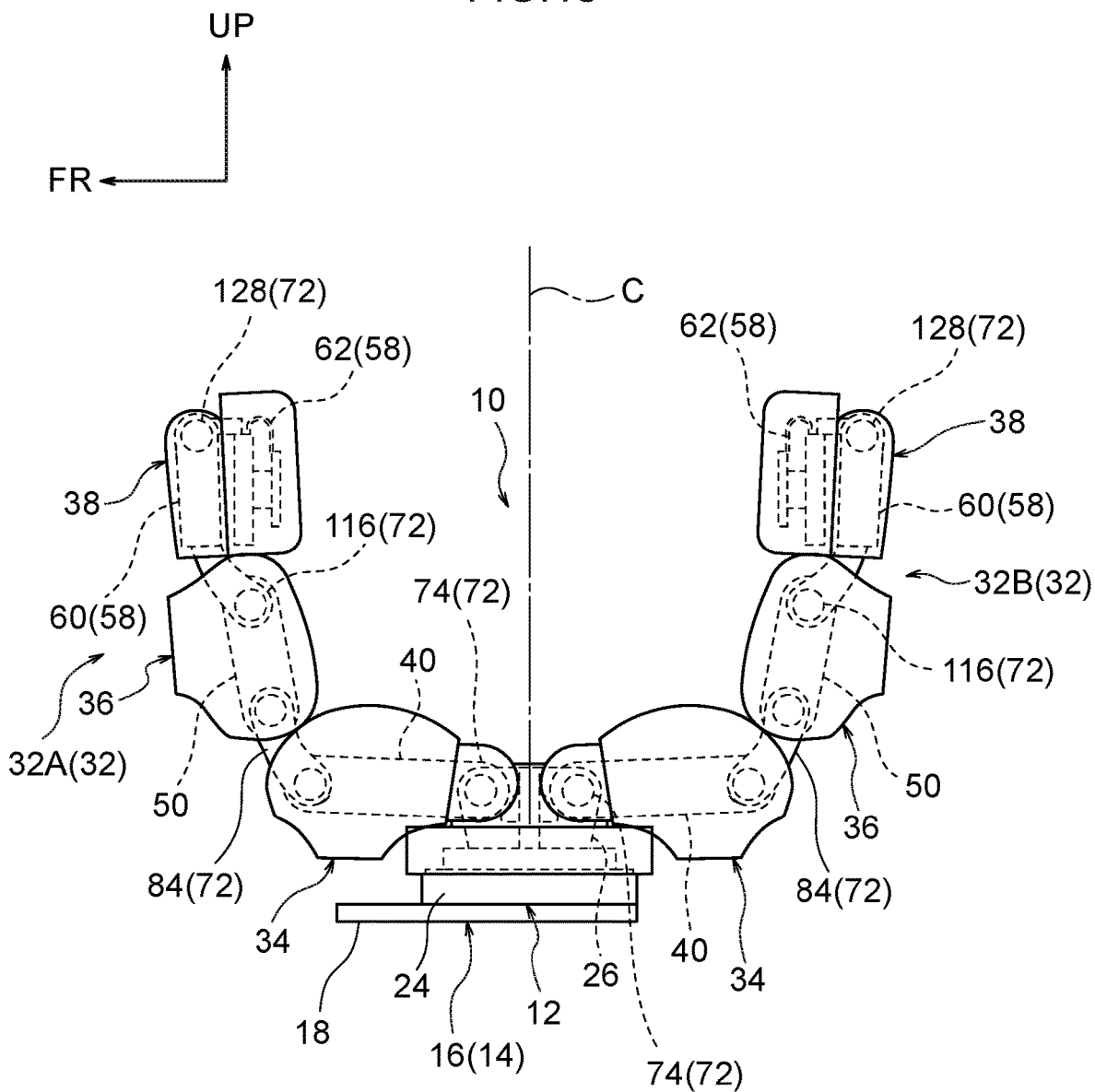
FIG. 13 is a side view schematically illustrating a state in which the vehicle seat has been set to a cargo mode.

The plural modes include a driving mode illustrated in FIG. 7, an face-to-face mode illustrated by solid lines in FIG. 8, a relax mode illustrated in FIG. 9, a sleep mode illustrated in FIG. 10, a circulation-boosting mode illustrated in FIG. 11, a child mode illustrated in FIG. 12, a cargo mode illustrated in FIG. 13, and a stowed mode illustrated in FIG. 14.

The driving mode illustrated in FIG. 7 is the default mode of the vehicle seat 10, and the vehicle seat 10 is normally in a driving mode state. In the driving mode, the seat orientation of the vehicle seat 10 is set so as to face forward to match the direction of progress of the vehicle (this is hereafter referred to as a forward-facing seat position). Namely, the seat section 32A disposed at the seat front-rear direction front side acts as a seat cushion section extending substantially along the seat front-rear direction, and the seat section 32B disposed at the seat front-rear direction rear side acts as a seatback section extending substantially along the seat up-down direction. When the seat section 32A is in this state, the buttocks of the occupant P1 are supported by the lower cushion section 34, the calves of the occupant P1 are supported by the middle cushion section 36, and the upper cushion section 38 is set to the footrest position to support the feet of the occupant P1. Moreover, in the seat section 32B, the lower back of the occupant P1 is supported by the lower cushion section 34, the upper back of the occupant P1 is supported by the middle cushion section 36, and the upper cushion section 38 is set to the headrest position to support the head of the occupant P1. The driving mode enables the seated occupant P1 to sit in the vehicle in a standard seating posture.

In the face-to-face mode illustrated by solid lines in FIG. 8, the seat orientation of the vehicle seat 10 is set so as to face rearward in the opposite direction to the direction of progress of the vehicle (this is hereafter referred to as a rearward-facing seat position). Namely, the seat section 32A disposed at the seat front side acts as a seatback section extending substantially along the seat up-down direction, and the seat section 32B disposed at the seat rear side acts as a seat cushion section extending substantially along the seat front-rear direction. When the seat section 32A is in this state, the lower back of the occupant P1 is supported by the lower cushion section 34, the upper back of the occupant P1 is supported by the middle cushion section 36, and the upper cushion section 38 is set to the headrest position to support the head of the occupant P1. Moreover, in the seat section 32B, the buttocks of the occupant P1 are supported by the lower cushion section 34, the calves of the occupant P1 are supported by the middle cushion section 36, and the upper cushion section 38 is set to the footrest position to support the feet of the occupant P1. The face-to-face mode for example enables the occupant P1 seated in the driving seat of the vehicle to sit face-to-face with an occupant seated in a rear passenger seat during autonomous driving.

In the relax mode illustrated in FIG. 9, as viewed along the seat width direction the seat section 32 on one side configures a seatback section set at a large angle toward the seat front-rear direction with respect to the center line C running through the base section 12 in the vehicle up-down direction. The occupant P1 is thereby capable of sitting with a relaxed posture. In FIG. 9, the vehicle seat 10 is set to the forward-facing seat position, in which the seat rear side seat section 32B acts as the seatback section that is set at a large angle toward the seat rear side with respect to the center line C as viewed along the seat width direction. Note that the relax mode can also be selected when the vehicle seat 10 is been set to the rearward-facing seat position. Although not illustrated in the drawings, in such a configuration the seat front side seat section 32A is set at a large angle toward the seat front side with respect to the center line C as viewed along the seat width direction.

In the sleep mode illustrated in FIG. 10, both seat sections 32A, 32B are in a state angled as far as the horizontal position. In the sleep mode, a flat support face that supports the body of the occupant P1 is formed substantially along the horizontal direction, enabling the occupant P1 to adopt a sleeping posture. This for example enables the occupant in the driving seat to sleep while the vehicle proceeds toward its destination during autonomous driving. Alternatively, an occupant in the rear passenger seat can sleep in a comfortable posture. Note that although FIG. 10 illustrates the sleep mode when the vehicle seat 10 has been set to the forward-facing seat position, there is no limitation thereto. The sleep mode may also be selected when the vehicle seat 10 has been set to the rearward-facing seat position.

In the circulation-boosting mode illustrated in FIG. 11, the seat form is basically the same as in the above-described sleep mode, except for that the lower cushion section 34 of the seat section 32A forming a seat cushion section is angled slightly toward the seat upper side of the horizontal direction, such that the legs of the occupant P are raised further toward the seat upper side than their upper body. Note that the middle cushion section 36 and the upper cushion section 38 of the seat section 32A extend substantially along the horizontal direction. The circulation-boosting mode for example enables the occupant P to adopt a posture in which their lower body is raised further toward the seat up-down direction upper side than their upper body during a long journey, thereby relieving swelling in their lower body. Note that although FIG. 11 illustrates the circulation-boosting mode when the vehicle seat 10 has been set to the forward-facing seat position, there is no limitation thereto. The circulation-boosting mode may also be selected when the vehicle seat 10 has been set to the rearward-facing seat position.

In the child mode illustrated in FIG. 12, the seat sections 32A, 32B are made to face each other to form separate seats on which child occupants P2 are able to sit. In the child mode, the lower cushion sections 34 of the seat sections 32A, 32B are disposed angled toward the seat upper side as viewed along the seat width direction so as to support the calves of the respective occupants P2. The middle cushion sections 36 of the seat sections 32A, 32B are disposed substantially along the horizontal direction so as to configure seat cushion sections that support the buttocks of the respective occupants P2. The upper cushion sections 38 of the seat sections 32A, 32B are disposed angled toward the seat upper side as viewed along the seat width direction so as to configure seatback sections that support the backs of the respective occupants P2.

In the cargo mode illustrated in FIG. 13, the lower cushion sections 34 of the seat sections 32A, 32B are disposed substantially along the horizontal direction, and the middle cushion sections 36 and the upper cushion sections 38 of the seat sections 32A, 32B are disposed substantially along the vertical direction. In the cargo mode, a flat loading surface is formed by the lower cushion sections 34 of the seat sections 32A, 32B when loading cargo onto the vehicle seat 10 for transportation, enabling the cargo to be carried stably. Moreover, the middle cushion sections 36 and the upper cushion sections 38 are disposed substantially along the vertical direction at both seat front-rear direction sides of the lower cushion sections 34 of the seat sections 32A, 32B. Thus, the middle cushion sections 36 and the upper cushion sections 38 act as walls if the vehicle starts or stops suddenly, enabling the cargo to be suppressed from falling off the vehicle seat. This also enables the cargo to be stably transported.

In the stowed mode illustrated in FIG. 14, the seat sections 32A, 32B are both in a state set to the "upright position". The stowed mode enables the vehicle seat 10 to be made more compact in the seat front-rear direction and stowed when an occupant is not seated in the vehicle seat 10. Thus, for example, when a vehicle seat 10 employed as a rear passenger seat is set to the stowed mode, the loading capacity around the rear passenger seats of the vehicle cabin can be increased, or the luggage room of a hatchback vehicle can be enlarged.

Operation and Advantageous Effects

Explanation follows regarding operation and advantageous effects of the present exemplary embodiment.

In the vehicle seat 10 with the above configuration, the pair of seat sections 32 are supported by the base section 12 that is fixed to vehicle body floor, such that the pair of seat sections 32 are capable of tilting. In each of the seat sections 32, the lower cushion section 34, the middle cushion section 36, and the upper cushion section 38 are disposed in series in this sequence on progression from the base end portion toward the leading end portion of the seat section 32.

The pair of seat sections 32 are disposed opposing each other as viewed along the seat width direction, and are each capable of being tilted between the horizontal position and the upright position with respect to the base section 12 using the hinge mechanism 72. This enables one of the pair of seat sections 32 to be tilted to an angle capable of supporting the lower body of the occupant P from the lower side, by swinging the lower cushion section 34, the middle cushion section 36, and the upper cushion section 38 to form a support face following the lower body of the occupant P. The one seat section 32 thereby acts as a seat cushion section (see the seat section 32A in FIG. 1 and FIG. 7). The other of the pair of seat sections 32 can be tilted to an angle capable of supporting the upper body of the occupant P1 from the rear side, by swinging the lower cushion section 34, the middle cushion section 36, and the upper cushion section 38 to form a support face following the upper body of the occupant P. The other seat section 32 thereby acts as a seatback section (see the seat section 32B in FIG. 1 and FIG. 7). By adjusting the positions of the pair of seat sections 32 in this manner, the positions of the seat cushion section and the seatback section of the vehicle seat 10 can be reversed, and the seat orientation of the vehicle seat 10 can be switched between the forward-facing seat position and the rearward-facing seat position.

Moreover, in the vehicle seat 10, the seat orientation can be switched simply by an operation to tilt the pair of seat sections 32 in predetermined directions with respect to the base section 12, thereby enabling a continuous support face to support the body of the occupant P to be formed by the plural cushion sections configuring the pair of seat sections 32. This suppresses the formation of unwanted gaps between the support faces of the seat sections 32 and the base section 12 while the seat orientation is being switched, thereby enabling a situation in which part of the body of the occupant P becomes trapped between the seat sections 32 and the base section 12 to be prevented.

In the present exemplary embodiment, as in the seat section 32A illustrated in FIG. 7, when one of the seat sections 32 configures a seat cushion section, the occupant P is supported from their buttocks to their feet by the one seat section 32. As in the seat section 32B illustrated in FIG. 7, when the other of the seat sections 32 configures a seatback section, the occupant P is supported from their back to their head by the other seat section 32. This enables the occupant P to be supported from their head to their feet by the pair of seat sections, such that the occupant P is able to sit in a relaxed posture. This enables the comfort of the occupant P while traveling to be increased.

In the present exemplary embodiment, the lower cushion section 34 and the corresponding middle cushion section 36 are coupled together by the second hinge section 84 configuring a double hinge mechanism, thereby enabling the two sections to be coupled together so as to be capable of swinging relative to each other while the second hinge section 84 absorbs the thicknesses of the lower cushion section 34 and the middle cushion section 36. This enables sufficient thicknesses to be secured for the lower pad 46 and the middle pad 56 respectively disposed at the lower cushion section 34 and the middle cushion section 36. Thus, the body of the seated occupant P can be stably supported despite the lower cushion section 34 and the middle cushion section 36 of each of the seat sections 32 being disposed at positions distanced from the base section 12, thereby enabling occupant restraint force from the seat sections 32 to be improved.

In the present exemplary embodiment, by swinging the rotatable frame 62 with respect to the under-frame 60 of the upper cushion section 38, the feet of the occupant P can be supported by the under-frame 60 when the upper cushion section 38 is in the footrest position, and the head of the occupant P can be supported by the rotatable frame 62 when the upper cushion section 38 is in the headrest position. Thus, even in cases in which the seat orientation of the vehicle seat 10 is reversed so as to switch between the forward-facing seat position and the rearward-facing seat position, the location of the upper cushion section 38 contacted by the feet contact and the location of the upper cushion section 38 contacted by the head can be kept separate, enabling hygiene to be secured. This enables user-friendliness for the occupant P to be further improved.

In the present exemplary embodiment, the swinging actions between the lower cushion sections 34, the middle cushion sections 36, and the upper cushion sections 38 are performed using the plural shafts that are rotated forward or backward by drive force from the plural motors. Specifically, the lower cushion sections 34 and the base section 12 are coupled together by the respective first hinge sections 74, and the first shafts 78 are rotated forward or backward by operation of the first motors 76 of the first hinge sections 74 to swing the lower cushion sections 34 with respect to the base section 12. The lower cushion sections 34 and the middle cushion sections 36 are coupled together by the respective second hinge sections 84, and the second shafts 94 and the third shafts 100 configuring the double hinge mechanisms are rotated forward or backward by operation of the second motors 92 and the third motors 98 of the second hinge sections 84. The middle cushion sections 36 thereby swing with respect to the lower cushion sections 34. Furthermore, the middle cushion sections 36 and the upper cushion sections 38 are coupled together by the respective third hinge sections 116, and the fourth shafts 120 are rotated forward or backward by operation of the fourth motors 118 of the third hinge sections 116 so as to swing the upper cushion sections 38 with respect to the middle cushion sections 36.

In the above configuration, movement of the lower cushion sections 34, the middle cushion sections 36, and the upper cushion sections 38 can be smoothly performed when switching between seated postures, enabling the occupant P to be suppressed from feeling discomfort, even when the seat form is switched while the occupant P remains seated in the vehicle seat 10.

In the present exemplary embodiment, the hinge mechanism 72 of the vehicle seat 10 is operated under the control of the ECU 140 so as adopt a state corresponding to a selected mode out of plural pre-stored modes. Thus, the occupant P is able to adjust their posture in the vehicle seat 10 by simply selecting a desired mode from out of the plural modes described above, thereby enabling adjustment of the seating posture to be performed with great ease.

Additional Explanation of Exemplary Embodiment

Although the first hinge sections 74 and the third hinge sections 116 are both single hinge mechanisms in the above exemplary embodiment, the present disclosure is not limited thereto, and double hinge mechanisms may be employed therefor.

Although the hinge mechanism 72 is configured including the first motors 76 to the fifth motors 130 in the above exemplary embodiment, the present disclosure is not limited thereto, and configuration may be made employing a hinge mechanism that is manually swung using manual adjustment levers or the like.

Although the pair of seat sections 32 each include the lower cushion section 34, the middle cushion section 36, and the upper cushion section 38 in the above exemplary embodiment, the present disclosure is not limited thereto. The upper cushion section 38 of the above exemplary embodiment may be omitted from either one or both of the seat sections.

Various other modifications may also be implemented within a range not departing from the spirit of the present disclosure. Obviously the scope of rights of the present disclosure is not limited by the above exemplary embodiment.

What is claimed is:

1. A vehicle seat, comprising:
a base section fixed to a floor of a vehicle;
a pair of seat sections that are disposed in opposition to each other, that are each supported by the base section so as to be tiltable between a horizontal position and an upright position, and that each seat section includes a plurality of cushion sections disposed in series and configured to support a body of an occupant, wherein the plurality of cushion sections of each seat section includes:
a lower cushion section that has a first end tiltably supported b the base section, the lower cushion section being configured to support the buttocks or the lower back of an occupant;
a middle cushion section that has a first end swingably supported by a second end of the lower cushion section, the middle cushion section being configured to support, the calves or the upper back of an occupant; and
an upper cushion section that has a first end swingably supported by a second end of the middle cushion section, the upper cushion section being configured to support the feet or the head of an occupant, the upper cushion section including a plate-shaped under-frame and a plate-shaped rotatable frame, the plate-shaped under-frame being configured to support the feet of an occupant when the upper cushion section is in a footrest position, and the plate-shaped rotatable frame being configured to support the head of an occupant when the upper cushion section is in a headrest position, the plate-shaped under-frame and the plate-shaped rotatable frame being coupled together so as to be swingable about an axis; and a hinge mechanism, the hinge mechanism comprising a pair of first hinge sections that attach the pair of seat sections to opposite ends of the base section such that the seat sections are tiltable with respect to the base section about a first pair of axes, wherein the plurality of cushion sections of each seat section are swingable relative to each other, wherein each of the lower cushion sections and the middle cushion sections are swingably coupled together by a double hinge mechanism in which one rotation shall provided at the second end of the lower cushion section and another rotation shaft provided at the first end of the middle cushion section are coupled together via a link.

2. The vehicle seat of claim 1, wherein the hinge mechanism includes:

a plurality of motors serving as drive sources; and a plurality of shafts that are rotated forward or backward by drive force from the plurality of motors.

3. The vehicle seat of claim 1, further comprising a control device configured to operate the hinge mechanism so as to adopt a state corresponding to a mode selected from a plurality of pre-stored modes.

4. The vehicle seat of claim 1, wherein the plurality of cushion sections comprises pads, wherein the link of the double hinge mechanism couples the second end of the lower cushion section and the other rotation shaft provided at the first end of the middle cushion section such that a continuous support face is formed by the pad of the lower cushion section and the pad of the middle cushion section to support the body of an occupant.

5. The vehicle seat of claim 1, wherein the plurality of cushion sections comprises pads, wherein each of the lower cushion sections and the middle cushion sections are swingably coupled together by the double hinge mechanism in which the one rotation shaft provided at the second end of the lower cushion section and the other rotation shaft provided at the first end of the middle cushion section are spaced apart by the link, at least a portion of the pad of the lower cushion section and the pad of the middle cushion section extending between the one rotation shaft and the other rotation shaft.

* * * * *